US007339738B1

(12) United States Patent
Carr et al.

(10) Patent No.: US 7,339,738 B1
(45) Date of Patent: *Mar. 4, 2008

(54) NANOMECHANICAL NEAR-FIELD GRATING APPARATUS AND ACCELERATION SENSOR FORMED THEREFROM

(75) Inventors: Dustin Wade Carr, Albuquerque, NM (US); Gregory Robert Bogart, Corrales, NM (US); Bianca E. N. Keeler, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 430 days.

This patent is subject to a terminal disclaimer.

(21) Appl. No.: 11/088,313

(22) Filed: Mar. 23, 2005

Related U.S. Application Data

(63) Continuation-in-part of application No. 10/829,782, filed on Apr. 22, 2004, now Pat. No. 7,173,764.

(51) Int. Cl.
*G02B 5/18* (2006.01)

(52) U.S. Cl. .................. 359/569; 359/566; 359/573; 359/291

(58) Field of Classification Search ............. 359/566, 359/568, 569, 573, 575, 291
See application file for complete search history.

(56) References Cited

U.S. PATENT DOCUMENTS

| 5,351,256 A | 9/1994 | Schneider et al. |
| 5,428,634 A | 6/1995 | Bryan et al. |
| 5,493,577 A | 2/1996 | Choquette et al. |
| 5,557,627 A | 9/1996 | Schneider et al. |
| 5,568,499 A | 10/1996 | Lear et al. |
| 5,633,527 A | 5/1997 | Lear et al. |
| 5,903,590 A | 5/1999 | Hadley et al. |
| 5,978,401 A | 11/1999 | Morgan |
| 6,515,751 B1 | 2/2003 | Craighead et al. |
| 6,549,010 B2* | 4/2003 | Roozen et al. .............. 324/318 |
| 6,628,851 B1 | 9/2003 | Rumpf et al. |
| 6,894,836 B2 | 5/2005 | Christenson |

(Continued)

OTHER PUBLICATIONS

Solgaard, et al, Deformable Grating Optical Modular, Optics Letters, vol. 1, No. 9, May 1, 1992, E. L. Ginzton Lab, Stanford Univ, Stanford, CA 9305.

(Continued)

*Primary Examiner*—Stephone B. Allen
*Assistant Examiner*—Lee Fineman
(74) *Attorney, Agent, or Firm*—John P. Hohimer

(57) ABSTRACT

A nanomechanical near-field grating device is disclosed which includes two sub-gratings vertically spaced by a distance less than or equal to an operating wavelength. Each sub-grating includes a plurality of line-elements spaced apart by a distance less than or equal to the operating wavelength. A light source (e.g., a VCSEL or LED) can provide light at the operating wavelength for operation of the device. The device can operate as an active grating, with the intensity of a reflected or transmitted portion of the light varying as the relative positions of the sub-gratings are controlled by an actuator. The device can also operate as a passive grating, with the relative positions of the sub-gratings changing in response to an environmentally-induced force due to acceleration, impact, shock, vibration, gravity, etc. Since the device can be adapted to sense an acceleration that is directed laterally or vertically, a plurality of devices can be located on a common substrate to form a multi-axis acceleration sensor.

37 Claims, 14 Drawing Sheets

U.S. PATENT DOCUMENTS 7,173,764 B2 * 2/2007 Carr et al. .................. 359/569
2003/0128361 A1 * 7/2003 Kurodà et al. .............. 356/400

OTHER PUBLICATIONS

Chen, et al, A Thick Polysilicon Surface Micromachined Optically Sensed Acceleromter, Part of the SPIE Conf on Silicon-based Optoelectronics, San Jose, CA, Jan. 1999.

Carr, et al, Laterally Deformable Nanomechanical Zeroth-Order Gratings: Anamalous Diffraction Studied by Rigorous Coupled-Wave Analysis, Optics Letters, vol. 28, No. 18, Sep. 15, 2003.

Carr, et al, Measurement of a Laterally Deformable Optical NEMS Grating Transducer, Proceedings of SPIE vol. 5346 (SPIE, Bellingham, WA, 2004).

Keeler, et al, Experimental Demonstration of a Laterally Deformable Optical Nanoelec tromechanical System Grating Transducer, Optics Letters, vol. 29, No. 11, Jun. 1, 2004.

Thrush, et al, Integrated Semiconductor Vertical-Cavity Surface-Emitting Lasers and PIN Photodetectors for Biomedical Fluorescence Sensing, IEEE Journal of Quantum Electronics, vol. 40, No. 5, May 2004.

Keeler, Laterally Deformable Optical NEMS Grading Transducers for Inertial Sensing Applications, SPIE vol. 5592 (SPIE, Bellingham, WA, 2005).

* cited by examiner

NANOMECHANICAL NEAR-FIELD GRATING APPARATUS AND ACCELERATION SENSOR FORMED THEREFROM

CROSS REFERENCE TO RELATED APPLICATIONS

This application is a continuation-in-part of application Ser. No. 10/829,782 filed Apr. 22, 2004 which issued as U.S. Pat. No. 7,173,764 on Feb. 6, 2007.

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates to optics and microelectromechanical devices in general, and, more particularly, to tunable diffraction gratings which can be used, for example, for acceleration sensing.

BACKGROUND OF THE INVENTION

As light travels through a uniform material, such as air, it behaves as a series of plane waves traveling in the direction of propagation. When a plane wave meets an obstruction, it undergoes a change due to interaction with that obstruction. Every unobstructed point on the wavefront of the wave can be considered as a source of a secondary spherical wavelet with the same wavelength and phase as the incident wave. The outgoing wavefront is the combination of all of these wavelets.

For example, if a plane wave that is traveling through water strikes a barrier that has a single small aperture (i.e., no wider than the wavelength), the outgoing wave takes a form similar to the wavefront that would be generated if a pebble were dropped into the water at the aperture. The incident plane wave is said to diffract outwardly from the aperture in a circular pattern. If the barrier contains an aperture that is larger than the wavelength, the wavefront that emerges from the aperture takes a form similar to the wavefront that would be generated if a continuous series of pebbles were dropped in a line in the aperture. As a result, the portion of the incoming wave that is incident upon the aperture appears to pass through substantially unaltered, while the remainder is blocked by the barrier. At the edges of the emerging wave, some diffraction is evident.

Two major regions surround the aperture; a near-field region and a far-field region. The near-field region is the region within one wavelength of the aperture and the far-field region is the region beyond the distance of one wavelength. The form of a wavefront that emerges from an aperture depends upon whether the point of observation is in the near-field region or far-field region. In the near-field region, the aperture is nearly perfectly imaged showing only minor fringes at the edges due to diffraction. As the point of observation is moved beyond one wavelength from the aperture, the fringes become more significant. In the far-field, the image of the aperture is diffraction limited. In other words, diffraction increases fringing in the image of the aperture to such an extent that the aperture is no longer perfectly imaged.

In a case in which the barrier contains multiple apertures, the waves that emerge from each aperture interact with one another in the far-field region. These emerging waves undergo constructive and destructive interference based on their relative phases. For example, if the peak of a wave from a first aperture meets a valley of a wave from a second aperture, the two waves will cancel each other out (i.e., destructive interference). No sign of a wave will be apparent at that point. If, however, the peak of the first wave coincides with a peak of the second wave, they will combine constructively resulting in one relatively larger wave at that point. This behavior—destructive and constructive interference—forms the basis for a diffraction grating, which is a repetitive array of objects, either apertures or opaque constructions, which produce periodic changes to the phase and/or amplitude of an optical wave that emerges from the grating.

There are a variety of different types of fixed diffraction gratings. One type is the one-dimensional (linear) Bragg diffraction grating. This diffraction grating resembles a comb, wherein there is a fixed, uniform spacing between the teeth. This uniform spacing, as well as the width and depth of the teeth, determines the output characteristics of the grating. The linear Bragg grating is designed to diffract light having a specific wavelength into modes that emerge along multiple discrete angles. That specific wavelength is defined to be the "operating wavelength" of the grating. The light that emerges from the grating without deviation from the incident angle is defined to be in the zeroth-order mode. In a transmissive grating, light emerges at the opposite side of the grating from which it entered; while, in a reflective grating, light emerges from the same side of the grating. The angle of each of the higher-order modes, and the amount of light in each mode, depends on the design of the grating and the wavelength of the incident light.

In contrast to fixed diffraction gratings, tunable diffraction gratings have been developed wherein the spacing between elements can be varied in order to change the performance of the grating and enable operation over a range of wavelengths. Tunable diffraction gratings are able to:
- change the distribution of light that emerges in the zeroth and higher-order modes;
- change the angles at which the higher-order modes emerge; and
- change the wavelength of operation of the grating.

One example of a tunable diffraction grating is the laterally-deformable first-order grating. In this type of grating, the grating pitch of a single-plane of uniformly-spaced grating elements is mechanically changed through "accordion-like" expansion or compression of the entire grating. Expansion and compression have been applied through various means including mechanical actuators such as piezoelectric elements, MEMS lateral actuators, electromagnetic actuators, and thermal actuators. Unfortunately, laterally-deformable gratings have suffered from non-uniform compression due to mechanical irregularities as well as poor reliability due to large induced strains in the grating materials.

A second type of tunable grating is the vertically-deformable first-order grating. One example of this type of grating is disclosed by Solgaard et al. in "Deformable Grating Light Valve," *Optics Letters*, v(17) 1992 (hereinafter referred to as "the Solgaard device"). These gratings comprise two "half-gratings," each of which has a linear array of grating elements. Each half-grating has a 50% fill-factor and the same half-grating pitch (i.e., the repeat distance of the grating elements in the half-grating). The top grating is laterally shifted by one-half of the half-grating pitch, such that the structure appears to be a continuous sheet of material when viewed from above. In its undeflected state, the respective top surfaces of the two half-gratings are separated by a multiple of one-half of the wavelength of incident light. As a consequence, incident light substantially entirely reflects from the structure (i.e., the outgoing light is in the zeroth-order mode). When the vertical distance that separates the two top surfaces is changed by an amount equal to one-quarter of the incident wavelength, the optical energy is substantially completely diffracted into the negative and positive higher-order modes.

In its deflected state, the Solgaard device operates on the far-field of the emerging light in the same manner as a conventional diffraction grating. Specifically, in the far field, reflected wavelets from each grating element combine constructively and destructively as a function of the relative phase of the multiple wavelet components at each point in space.

In its undeflected state, the Solgaard device approximates a mirror surface due to the 360° phase difference (i.e., one complete wavelength) between the two half-gratings. Light having the same wavelength emanating from two points that are separated by an integer multiple of a wavelength reinforce each other (i.e., combine constructively).

Laterally-deformable diffraction gratings based on MEMS are also known, such as the MEMS reconfigurable optical grating described by Rumpf et al., in U.S. Pat. No. 6,628,851. Rumpf describes a conventional diffraction grating wherein each line-element is attached to an individual lateral actuator in order to enable reconfigurability within the plane containing the conventional line-elements.

The range of motion required for known laterally-deformable or vertically-deformable tunable diffraction gratings is a significant fraction of the operating wavelength of the grating. As a consequence, the speed of response (i.e., operating bandwidth) and reliability of these tunable diffraction gratings are limited by mechanical considerations, such as the size and mass of the line-elements and the amount of induced strain that is required to affect a desired change in operating characteristic.

SUMMARY OF THE INVENTION

The illustrative embodiment of the present invention is a nanomechanical near-field grating apparatus which has applications for forming an acceleration sensor. The term "acceleration" as used herein is intended to include any mechanical force which can be sensed by the nanomechanical near-field grating apparatus including a force due to a change in position or speed of the apparatus or an object to which the apparatus is attached or operatively connected, a force due to impact, shock or vibration from whatever source acting upon the apparatus, and changes in the force of gravity. The term "acceleration" as used herein is also intended to include a deceleration (i.e., a negative acceleration).

In a first illustrative embodiment, a nanomechanical near-field grating apparatus comprises a first sub-grating and a second sub-grating. Each sub-grating includes line-elements having a width and a thickness that is less than the operating wavelength of the grating. A plurality of apertures is collectively formed by the two sub-gratings, with each aperture having an aperture width and aperture depth. Aperture width is defined as the lateral distance between one line-element of the first sub-grating and one line-element of the second sub-grating. Aperture depth is defined as the vertical distance between the line-elements of the bottom-most sub-grating and the top of a line-element of the top-most sub-grating. One of the first or second sub-gratings is capable of motion such that the aperture width and/or aperture depth is variable. Changing the aperture width and/or aperture depth perturbs the near-field intensity distribution of the nanomechanical grating apparatus. A light source in the apparatus provides light at the operating wavelength on the first and second sub-gratings. A detector is located proximate to the first and second sub-gratings in the apparatus to detect a portion of the light after reflection from or transmission through the first and second sub-gratings. This can provide information about any change in the aperture width and/or depth arising from an environmentally-induced force due to acceleration, shock, vibration, gravity, etc., thereby forming an acceleration sensor. A detection sensitivity in the apparatus can be enhanced by biasing the aperture width and/or depth. This can be done using a lateral actuator to bias the aperture width to a predetermined value; and by using a vertical actuator to bias the aperture depth to a predetermined value.

In another illustrative embodiment of the present invention, a plurality of nanomechanical near-field grating devices can be provided on a common substrate to form a multi-axis acceleration sensor.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the Specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
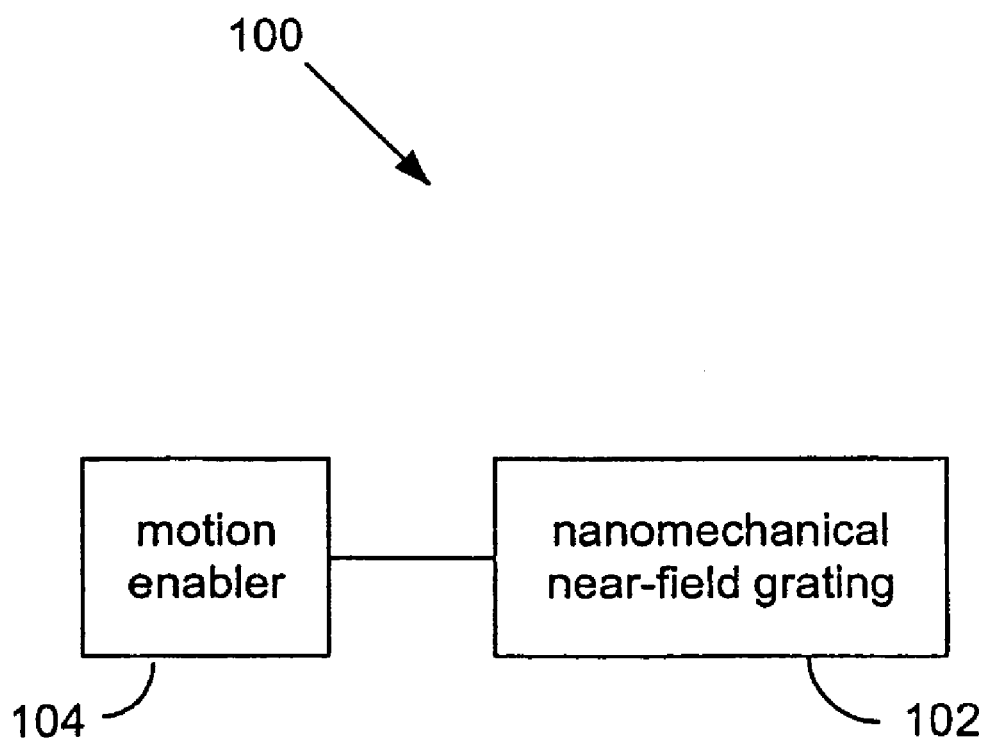
FIG. 1 depicts a schematic view of a tunable nanomechanical near-field grating in accordance with the illustrative embodiment of the present invention.

FIG. 1 depicts a schematic view of a tunable nanomechanical near-field grating apparatus 100 in accordance with the illustrative embodiment. As used in this Specification, the phrase "nanomechanical near-field grating" is defined as a grating comprising line-elements that have a width and a thickness which is less than one micron, and wherein at least some of the line-elements are separated by a distance which is less than the operating wavelength of the grating.

Figure 2:
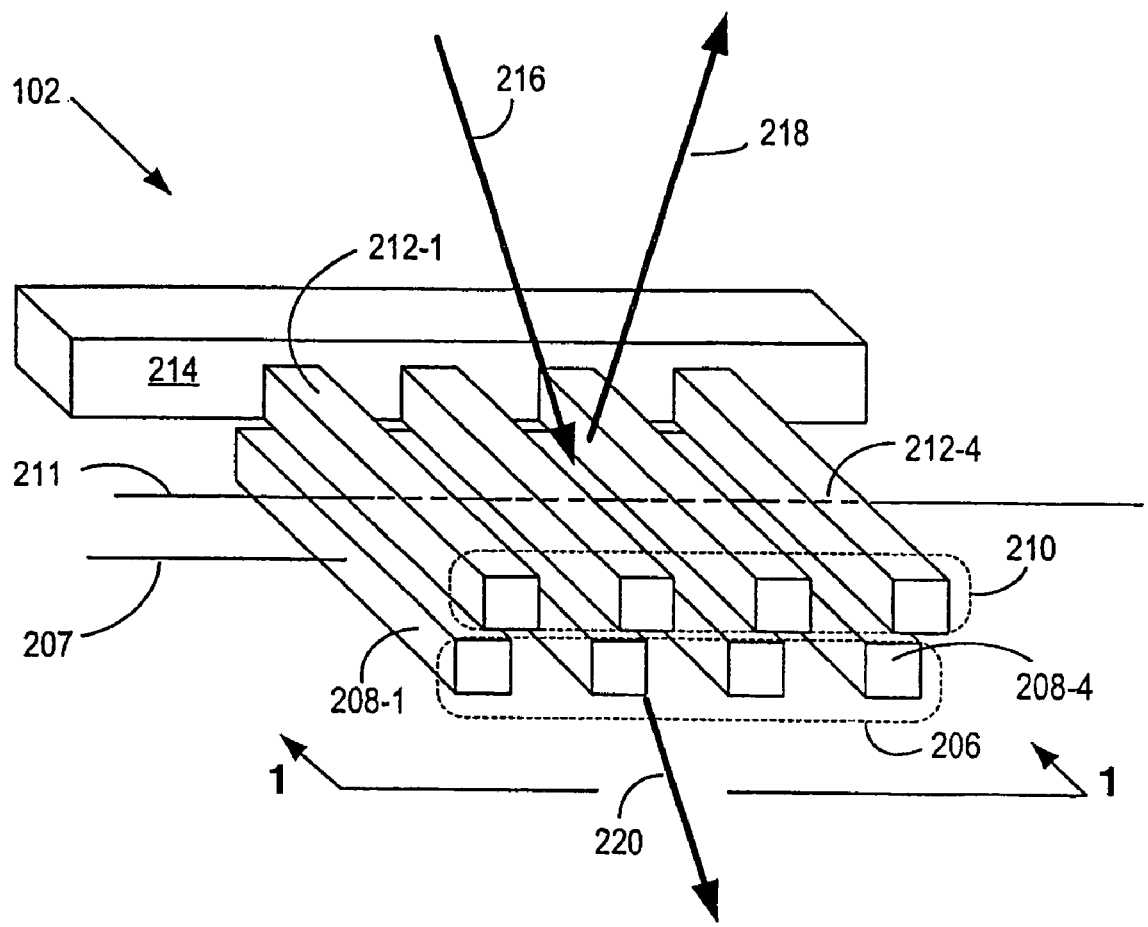
FIG. 2 depicts a perspective view of a tunable nanomechanical near-field grating in accordance with the illustrative embodiment.

The tunable nanomechanical near-field grating apparatus 100 comprises a nanomechanical near-field grating 102 (hereinafter, "grating") and a motion enabler 104. As depicted in FIG. 2, the grating 102 comprises sub-gratings 206 and 210. Sub-grating 206 includes the elements 208-$i$, i=1,4 (collectively, line-elements 208), which are spaced uniformly along lateral axis 207. The sub-grating 210 includes line-elements 212-$i$, i=1,4, (collectively, line-elements 212), which are spaced uniformly along lateral axis 211. The line-elements 212 depend from beam 214 which can form part of a support for the sub-grating 210 (e.g., a frame thereabout). Each line-element 208-$i$ is in the near-field region of the nearest line-element 212-$i$. Motion enabler 104 permits movement of line elements 212 within the near-field of line-elements 208 and thereby perturbs the near-field intensity distribution of grating 102. In some embodiments, motion enabler 104 simply permits movement of line-elements 212 in response to a change in an environmental factor (e.g., acceleration, temperature, etc.). In other embodiments, motion enabler 104 pro-actively moves line elements 212 in response to a control signal (in these embodiments, motion enabler 104 comprises an actuator).

As previously noted, there are two regions of observation for light interacting with obstacles and apertures (such as grating 102): the near-field region (within one operating wavelength) and the far-field region (beyond one operating wavelength). The optical-field intensity distribution in the near-field region of grating 102 behaves quite differently than that in the far-field region, in that light observed in the near-field region does not exhibit the diffraction effects that are observed in the far-field region. But the far-field emission pattern of grating 102 is a function of its near-field intensity distribution. As a consequence, perturbations to the near-field intensity distribution are observed as changes to the far-field emission pattern.

With continuing reference to FIG. 2, behavior in the near-field region can be characterized by analysis of the interaction of line-elements 208 and 212 and incident light 216. Each line-element 208-$i$ and 212-$i$ comprises an electron-oscillator that vibrates and reemits light at the wavelength of incident light 216. The mutual interaction of electron-oscillators that are associated with two line-elements rapidly decreases as the separation of the line-elements increases. The interaction reaches an inconsequential level at a distance substantially equal to the wavelength of incident light 216 (i.e., the operating wavelength of the grating).

The characteristics of reflected output signal 218 and transmitted output signal 220 are dependent upon the near-field intensity distribution of grating 102. Therefore, even slight motion of line-elements 212 with respect to line-elements 208 directly affects output signals 218 and 220. In particular, the distribution of optical intensity among the various diffraction orders composing output signals 218 and 220 changes as sub-grating 210 moves with respect to sub-grating 206.

Tunable nanomechanical near-field grating 102 operates either as an active grating or a passive grating as a function of the manner in which the relative position of sub-gratings 206 and 210 changes. As used herein, the term "active grating," when used to describe tunable nanomechanical near-field grating 102, means that the relative positions of sub-gratings 206 and 210 is pro-actively controlled (typically to control the intensity of a diffractive mode of either output signals 218 or 220). As used herein, the term "passive grating," when used to describe the tunable nanomechanical near-field grating 102, means that the relative position of sub-gratings 206 and 210 is not pro-actively controlled. In some embodiments in which tunable nanomechanical near-field grating 102 is implemented as a passive grating, the intensity of a diffraction mode of either output signal 218 or 220 is monitored in order to detect a change in the relative position of the sub-gratings (typically due to the impact of an environmental factor, such as temperature, acceleration, etc.). One example of tunable nanomechanical near-field grating 102 implemented as a passive grating is a sensor, such as, without limitation, an accelerometer, shock or vibration sensor, gravity sensor, radiation sensor, temperature sensor, or chemical sensor.

Figure 3A:
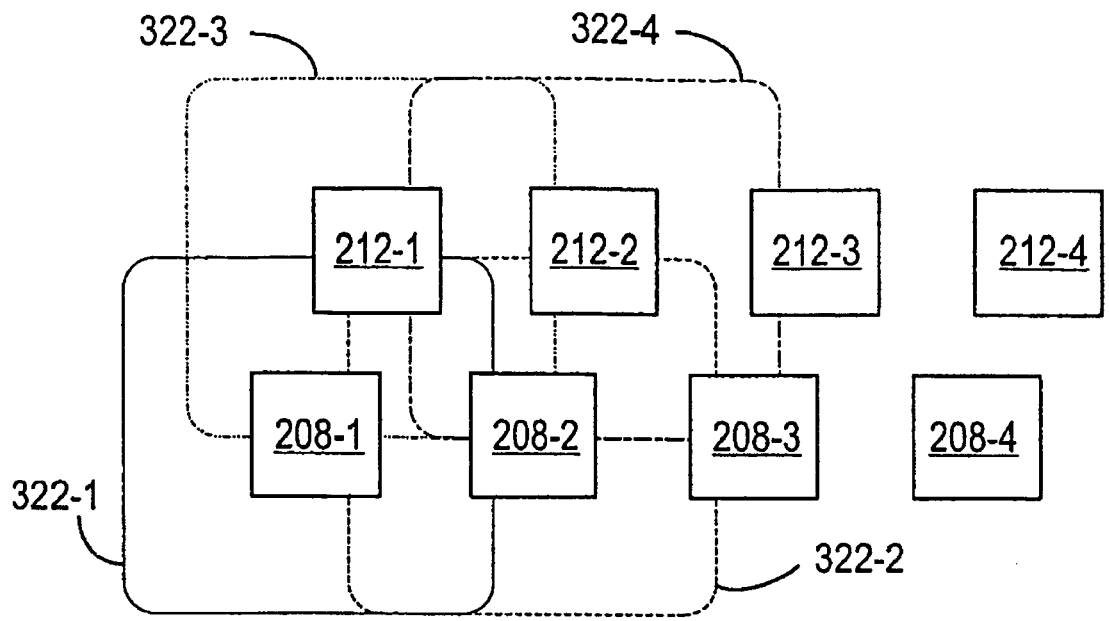
FIGS. 3A and 3B depict side views of the features along axes 207 and 211, as seen in view 1-1 of FIG. 2, in accordance with the illustrative embodiment of the present invention.

FIG. 3A is a side view of grating 102 of FIG. 2 in the direction indicated, with beam 214 omitted for clarity. As depicted in FIG. 3A, each of line-elements 208-$i$ is located within the near-field region of at least one line-element 212-$i$, and vice-versa. For example, line-element 212-1 is within near-field region 322-1 of line-element 208-1, and line-element 208-1 is within near-field region 322-3 of line-element 212-1. For clarity, not all near-field regions associated with line-elements are shown.

Figure 3B:
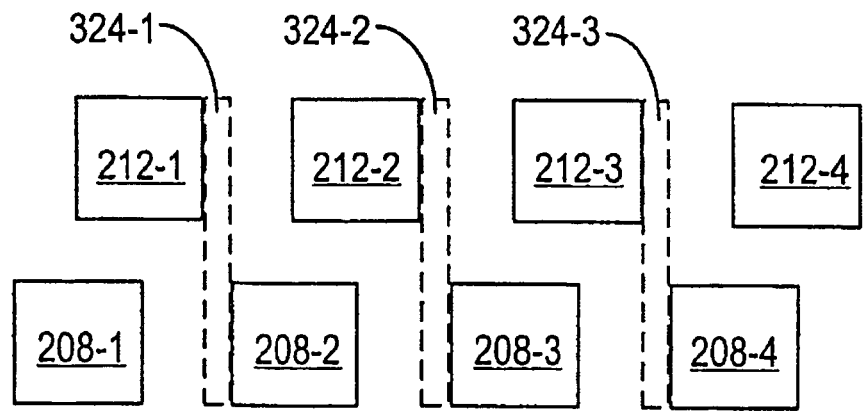

As depicted in FIG. 3B, grating 102 comprises apertures 324-1 through 324-3 (collectively, apertures 324). Each aperture has an aperture width and an aperture depth, which are defined by the lateral and vertical spaces, respectively, between one of line-elements 208 and one of line-elements 212. For example, aperture 324-1 has an aperture width defined by the lateral space between line-elements 212-1 and 208-2 and an aperture depth defined by the vertical space between the top of line-element 212-1 and the bottom of line-element 208-2.

Since the far-field behavior of grating 102 is a function of its near-field intensity distribution, a nanometer-scale change to the aperture width or aperture depth of apertures 324 results in a significant change to output signals 218 and 220. For example, lateral motion of less than 50 nanometers results in an appreciable change of the zeroth-order-mode output intensity of output signals 218 and 220. As a result of this small motion requirement, tunable nanomechanical near-field grating 102 is capable of high-speed behavior that has been hitherto difficult to attain. In addition, when used as a sensor, tunable nanomechanical near-field grating 102 provides a sensitivity to outside influences that is typically much greater than prior-art devices.

Although grating 102 is a Bragg grating in the illustrative embodiment, in other embodiments, grating 102 is a tunable chirped grating, a tunable distributed Bragg grating, and other types of gratings.

Figure 4A:
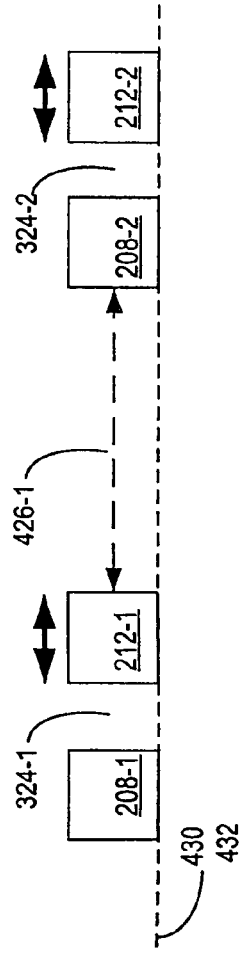
FIGS. 4A-4C depict side views of alternative arrangements of the features along axes 207 and 211, as seen in view 1-1 of FIG. 2, in accordance with the illustrative embodiment of the present invention.
Figure 4B:
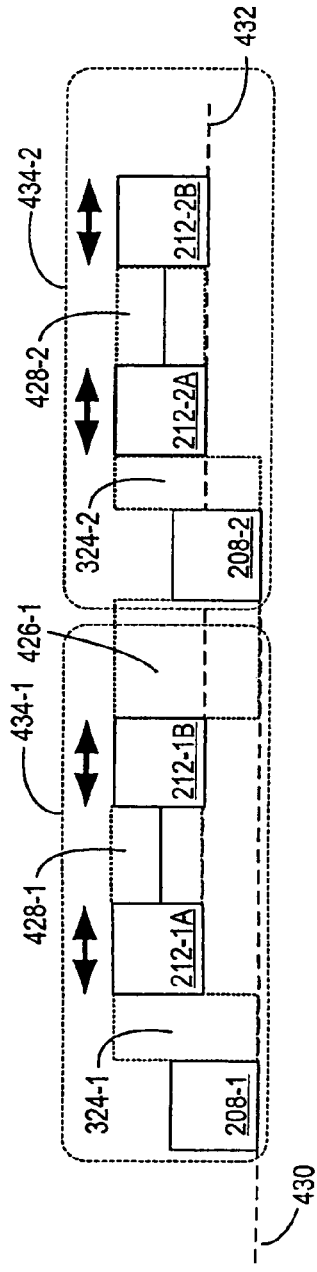
Figure 4C:
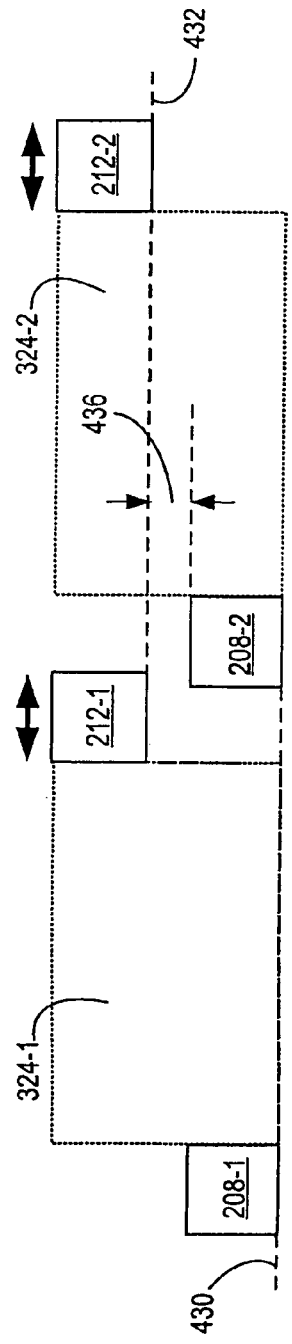

An important characteristic of grating 102 is the close proximity of a line-element (e.g., line-element 212-1) from sub-grating 210 and a line-element (e.g., line-element 208-2) from sub-grating 206. In accordance with the illustrative embodiment, nearest-neighbor line-elements, one from each sub-grating, are spaced apart by no more than one operating wavelength. FIGS. 4A, 4B, and 4C depict side views of alternative arrangements of the line-elements 208 and 212. In each of the three arrangements shown, line-elements 208 lie on plane 430, and line-elements 212 lie on plane 432. Planes 430 and 432 extend "into the page."

The line-elements depicted in FIGS. 4A-4C are supported in the same manner as is depicted in FIG. 2. That is, line-elements 212 compose sub-grating 210. Line-elements 212 are rigidly coupled to beam 214 on a fixed repeat period along axis 211. In some embodiments, the repeat period is less than or equal to the operating wavelength, while in other embodiments the repeat period is greater than the operating wavelength. Line-elements 208, which are arrayed along axis 207, compose sub-grating 206. Sub-grating 206 has substantially the same fixed repeat period as that of sub-grating 210.

In FIG. 4A, plane 430 and plane 432 are coincident and, as a result, line-elements 208 and 212 are substantially co-planar. For a grating having a planar arrangement such as that shown in FIG. 4A, perturbation of the near-field intensity distribution is substantially limited to that achieved through lateral movement of one of sub-gratings 206 and 210.

As depicted in FIG. 4B, line-elements 212 collectively form a plurality of unit-cells 434-*i*, i=1,n, two of which are shown. Each unit-cell 434-*i* contains two line-elements. For example, unit-cell 434-1 contains line-elements 212-1A and 212-1B. In embodiments such as that shown in FIG. 4B, fixed aperture 428-*i*, i=1,n, and second non-fixed apertures 426-*i*, i=1,n, are formed in addition to apertures 324-*i*. Alternative arrangements are shown in FIGS. 4A and 4C, wherein each unit cell contains one line-element 212-*i*.

In FIG. 4B, planes 430 and 432 are separated by a vertical distance less than the thickness of line-elements 208, and as a result line-elements 208 and 212 overlap vertically, but are not co-planar.

FIG. 4B depicts an embodiment comprising unit-cells that each include one independently variable aperture. It will be clear to those skilled in the art, however, after reading this Specification, how to make and use embodiments of the present invention wherein each unit-cell includes a plurality of independently variable apertures. Furthermore, it will be clear to those skilled in the art how to make and use alternative embodiments of the present invention wherein each unit-cell includes a plurality of line-elements, such that each is capable of movement that is independent from any other line-element included in said unit-cell.

In FIG. 4C, planes 430 and 432 are separated by a vertical distance greater than the thickness of line-elements 208, but vertical separation 436 between the top of line-elements 208 and the bottom of line-elements 212 is less than or equal to the operating wavelength. For a grating having an arrangement of line-elements as shown in FIGS. 4B and 4C, perturbation of the near-field intensity distribution can be accomplished through lateral and/or vertical movement of one of the sub-gratings 206 and 210.

Each of FIGS. 4A-4C depict arrangements that have one movable sub-grating and one fixed sub-grating. It will be clear to those skilled in the art, however, after reading this Specification, how to make and use embodiments of the present invention that comprise more than one independently-moveable sub-grating. Furthermore, it will be clear to those skilled in the art how to make and use alternative embodiments of the present invention that include at least three sub-gratings, at least one of which is movable.

Figure 5A:
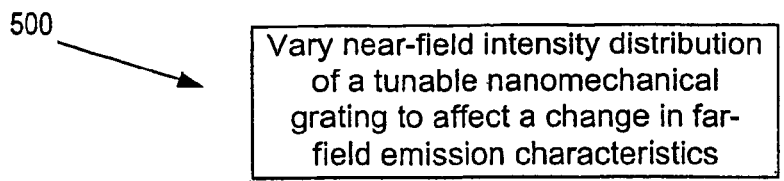
FIGS. 5A-5D depict method 500, suitable for controlling the zeroth-order mode intensity of an optical signal, or sensing a change to an environmental factor by monitoring the intensity of the zeroth-order mode of an optical signal.
Figure 5B:
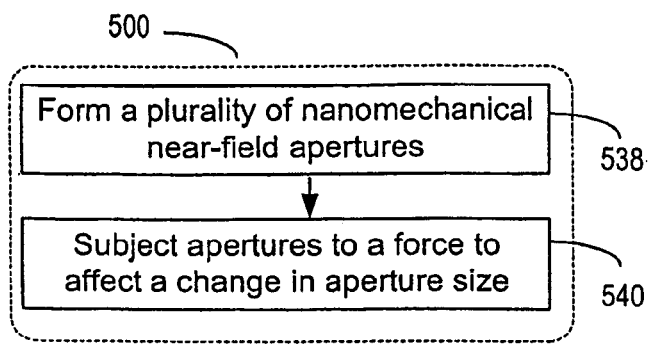

FIG. 5A depicts method 500, for altering the far-field emission characteristics of a tunable grating, such as grating 102, by perturbing the grating's near-field intensity distribution. FIG. 5B depicts an embodiment of method 500. In the embodiment depicted in FIG. 5B, method 500 includes operations 538 and 540. Operation 538 recites forming a plurality of nanomechanical near-field apertures (e.g., apertures 324, etc.). For the purposes of this Specification, "near-field apertures" are defined as apertures that have an aperture width (as shown in FIGS. 3A and 3B) less than the operating wavelength of the grating.

In operation 540, the apertures are subjected to a force that causes an aperture dimension to change. Such a change in aperture dimension includes a change in aperture width, aperture depth, or both aperture width and aperture depth. Operation 540 can comprise either a pro-active application of force (i.e., a force that is applied to cause a change in aperture width and/or aperture depth) or a reactive force (i.e., a force imparted due to a change in an environmental factor, such as an acceleration, shock or vibration, change in gravity, change in temperature, etc.).

Figure 5C:
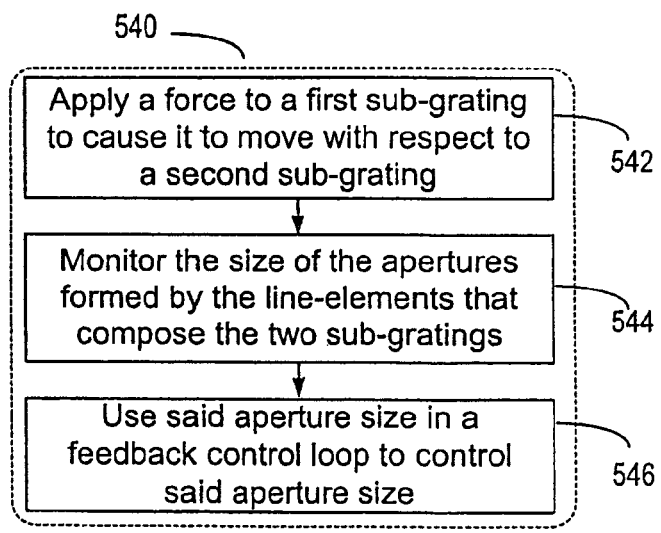

FIG. 5C depicts an embodiment of sub-operation 540 in which force is applied pro-actively, as for an active grating. In such embodiments, aperture dimension varies in response to a drive signal applied to an actuator that is coupled to grating 102. In sub-operation 542, a force is applied to a first sub-grating of a nanomechanical near-field grating, such as sub-grating 210 of grating 102, to cause it to move with respect to a second sub-grating, such as sub-grating 206 of grating 102. This force is applied using any one of a variety of suitable actuators, such as without limitation, an electro-static lateral comb drive, electromagnetic lateral actuator, thermal actuator, rack and pinion lateral actuator, piezoelectric actuator, or others as will occur to those skilled in the art in view of the present disclosure.

Sub-operations 544 and 546 are optional and are used in embodiments in which closed-loop feedback control is desired. In sub-operation 544, the dimensions of the apertures formed by the line-elements of the two sub-gratings, such as apertures 324 of grating 102 are monitored. The width and/or depth of the apertures can be monitored by monitoring the intensity of one of the diffraction modes of the output signal (such as signals 218 or 220), or by direct measurement of an aperture dimension through measurement of a parameter, such as and without limitation, capacitance, inductance, tunneling current, piezo-resistivity, or others as will occur to those skilled in the art in view of the present disclosure. In sub-operation 546, the aperture size obtained in operation 544 is used in a feedback loop, familiar to those skilled in the art, to control the aperture size. Used without sub-operations 544 and 546, operation 542 results in open-loop control of aperture size.

Figure 5D:
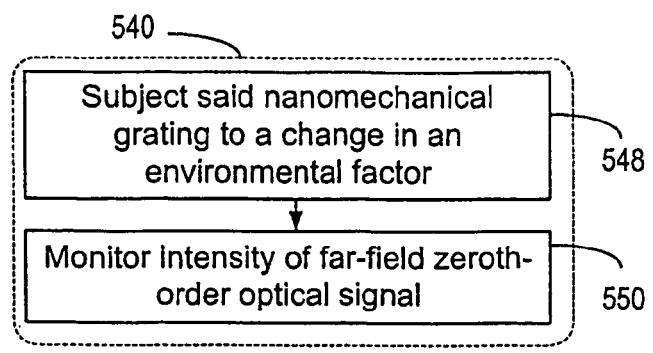

FIG. 5D depicts an embodiment of sub-operation 540 in which force is not applied pro-actively, as for an active grating. In such embodiments, an aperture dimension varies in response to a change in an environmental factor. Sub-operation 548 describes subjecting a nanomechanical grating, such as grating 102, to a force initiated by a change in an environmental factor (e.g., an environmentally-induced force such as a force due to acceleration). Sub-operation 550 describes monitoring the intensity of the far-field emission pattern of the grating. Sub-operation 550 enables use of grating 102 as a sensor in either an analog fashion, wherein the relative amount of force is quantified, or digital fashion, wherein the presence of an environmentally-induced force is detected. Environmentally-induced forces include, but are not limited to, acceleration, shock, vibration, temperature change, incident radiation, chemical concentration, or others as will occur to those skilled in the art in view of the present disclosure.

Figure 6:
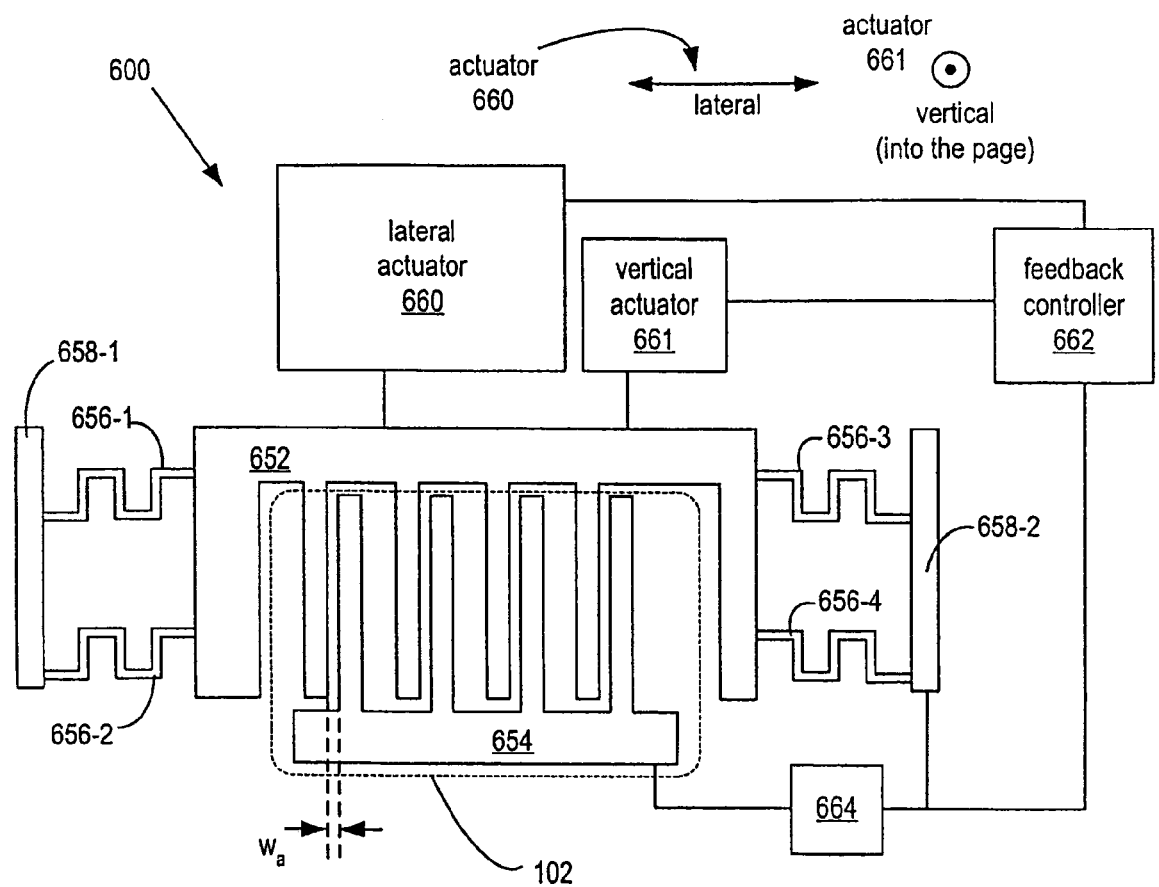
FIG. 6 depicts a top view of a tunable nanomechanical near-field grating implemented as an active grating in accordance with the illustrative embodiment.

FIG. 6 depicts a top view of a tunable nanomechanical near-field grating implemented as active grating 600 in accordance with the illustrative embodiment. Device 600 comprises grating 102, which comprises sub-gratings 652 and 654. Sub-gratings 652 and 654 each include a plurality of rigidly-coupled nanomechanical line-elements. Sub-grating 652 is suspended above sub-grating 654 by means of springs 656-1 and 656-2, which are connected to anchor 658-1, and springs 656-3 and 656-4, which are connected to anchor 658-2. The line-elements of sub-gratings 652 lie within the near-field of the line-elements of sub-grating 654.

Sub-grating 652, lateral actuator 660, and vertical actuator 661 are coupled. Lateral actuator 660 enables a change in the lateral spacing between the line-elements of sub-grating 652 and the line-elements of sub-grating 654. Vertical actuator 661 enables a change of the vertical spacing between the line-elements of sub-grating 652 and the line-elements of sub-grating 654. A change to the spacing between the two sets of line-elements enables results in a change of the near-field intensity distribution of grating 102 and a resultant change of the far-field optical behavior of the grating 102.

The movement of lateral actuator 660 is controlled by feed-back controller 662, which acts to reduce the difference between a control signal that corresponds to the desired position of sub-grating 652 and the signal received from capacitance sensor 664 which monitors the aperture width, $w_a$.

Figure 7:
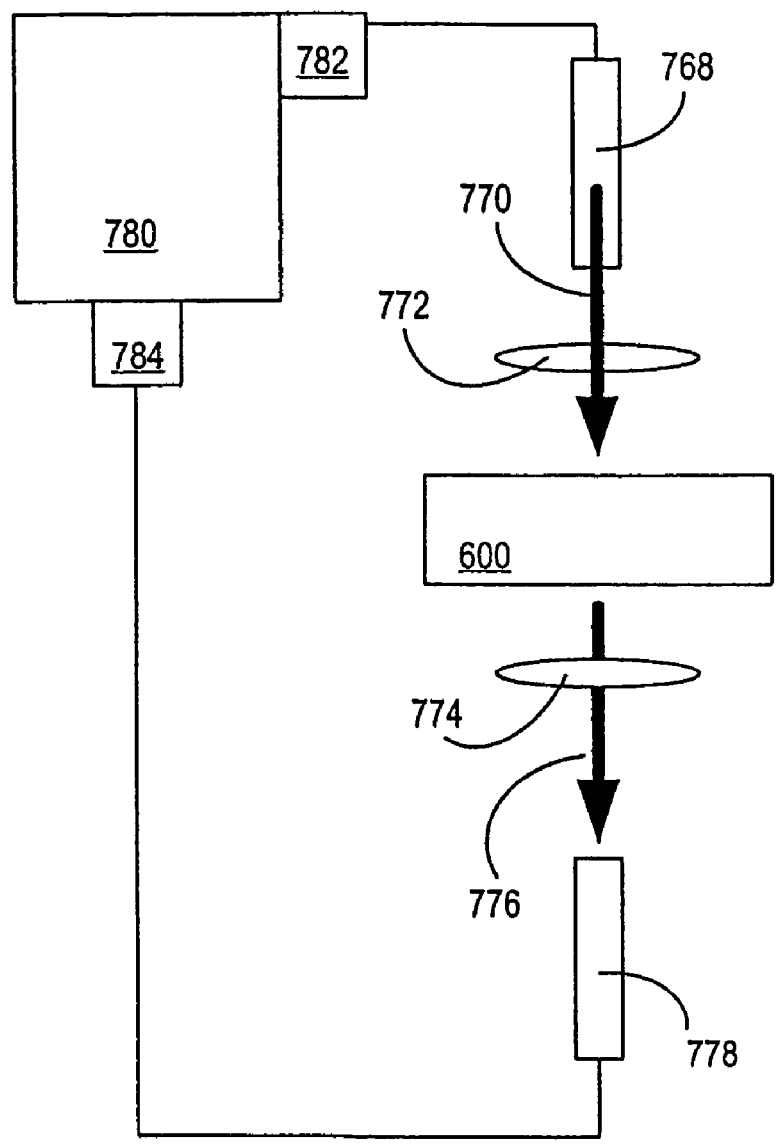
FIG. 7 depicts an optical communications network that incorporates an active grating, in accordance with the illustrative embodiment.

FIG. 7 depicts an optical communications network that incorporates active grating 600, in accordance with the illustrative embodiment. Input signal 770 is emitted from input optical fiber 768, which is connected to transmitter 782 of optical communications network 780. Input signal 770 propagates through input optical element 772 and is directed toward active grating 600.

As described in conjunction with FIG. 6, the position of sub-grating 652 relative to sub-grating 654 is controlled to alter the near-field intensity distribution of grating 102 and, thus, alter the far-field pattern of output signal 776 to achieve the desired output-signal characteristics of output signal 776. At least a portion of output signal 776 is captured by output optical element 774. The output optical element also redirects at least a portion of output signal 776 into output optical fiber 778, which is connected to receiver 784 of communications network 780. In other embodiments, optical fibers 768 and 778 could be planar waveguides, or any other optical waveguide suitable for carrying input signal 770 and output signal 776.

In an optical communications network application, active grating 600 can be used to provide or enable a variety of functions such as optical modulation, signal attenuation, on-off switching, wavelength equalization, tunable wavelength channel blocking, wavelength adding or dropping, tunable spectrometry, wavelength selection, or channel monitoring.

Figure 8:
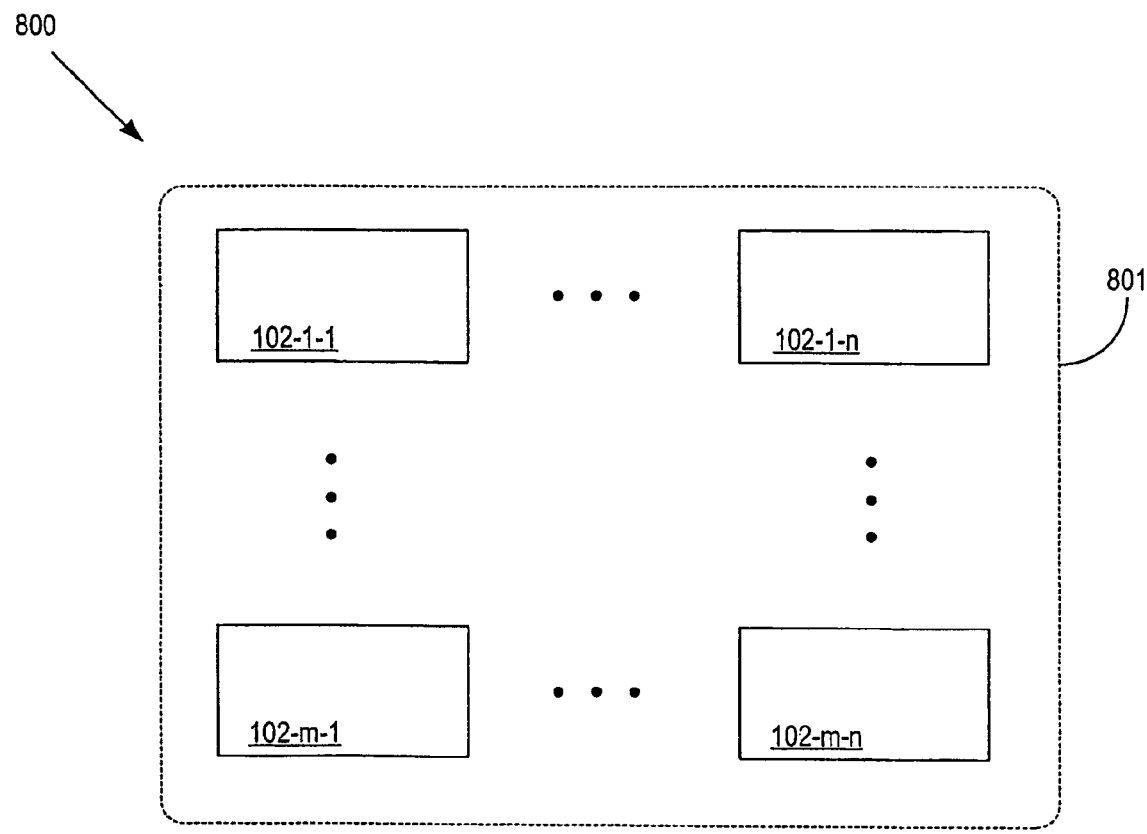
FIG. 8 depicts a top view of a two-dimensional array of tunable nanomechanical near-field gratings in accordance with the illustrative embodiment of the present invention.

FIG. 8 depicts a top view of a two-dimensional array of tunable nanomechanical near-field gratings in accordance with the illustrative embodiment of the present invention. Array 801 comprises tunable nanomechanical near-field gratings 102-1-1 through 102-$m$-$n$. The gratings can be active gratings (such as active grating 600), passive gratings, or any combination of active and passive gratings. In some embodiments, array 801 includes gratings that have the same operating wavelength. In some other embodiments, each grating has a unique operating wavelength.

Figure 9:
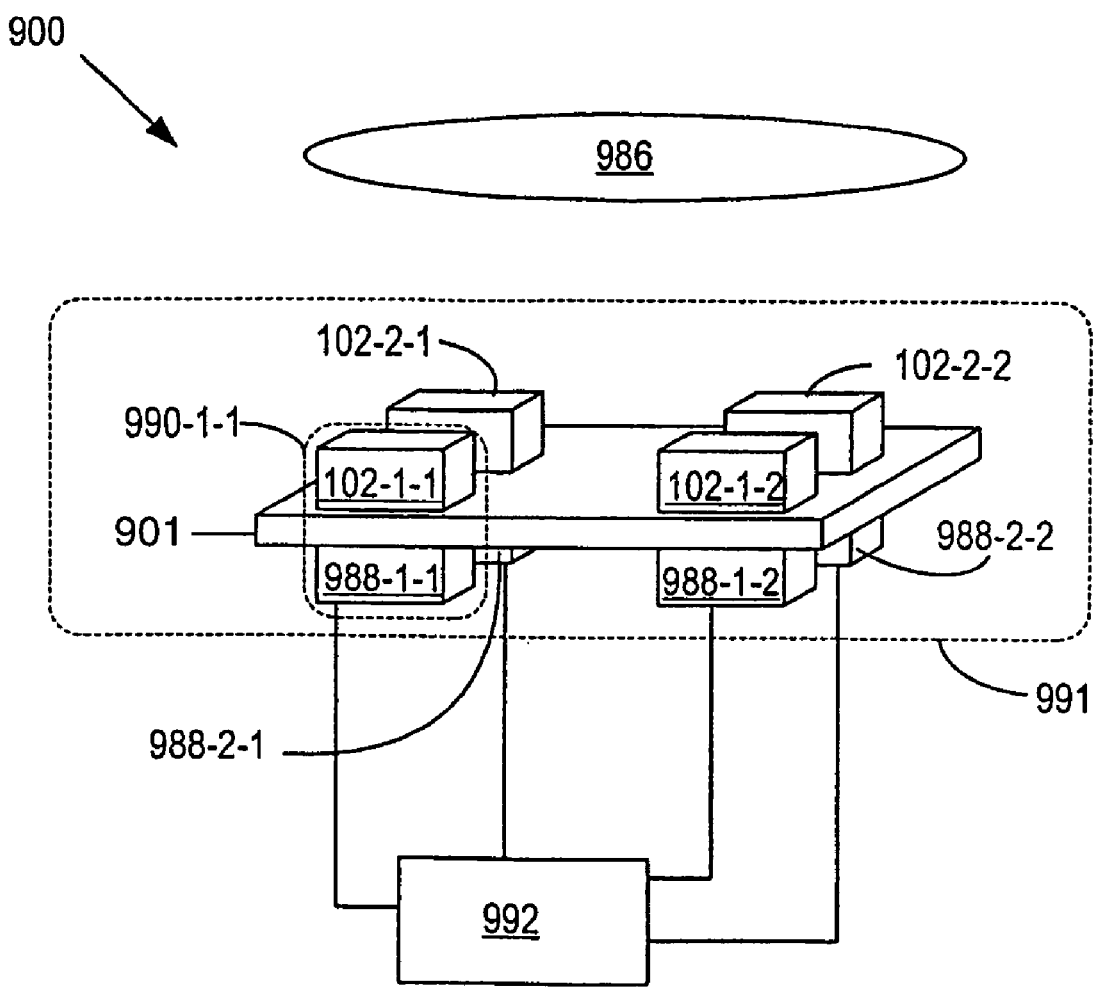
FIG. 9 depicts a perspective view of an imaging system that incorporates a two-dimensional array of tunable nanomechanical near-field gratings in accordance with the illustrative embodiment of the present invention.

FIG. 9 depicts a perspective view of an imaging system that incorporates array 801, which is implemented as a tunable focal plane array comprising a plurality of pixels, wherein each pixel contains a tunable nanomechanical near-field grating. Imaging system 900 comprises imaging element 986, which conditions and directs light from a scene onto focal plane array 991. Focal plane array 991 comprises array of pixels 900-$m$-$n$, wherein each pixel comprises a tunable nanomechanical near-field grating 102-$m$-$n$ and an optical detector 988-$m$-$n$. For example, pixel 990-1-1 comprises grating 102-1-1 and optical detector 988-1-1. Each grating 102-$m$-$n$ and optical detector 988-$m$-$n$ can be provided on a common substrate 901, with each optical detector 988-$m$-$n$ being located beneath grating 102-$m$-$n$. When the gratings 102-$m$-$n$ are provided on a top surface of substrate 901, the optical detectors 988-$m$-$n$ can be provided beneath the gratings 102-$m$-$n$ on the top surface of the substrate 901 (e.g., when the substrate 901 is not transmissive to the light output signal 220 from each grating 102-$m$-$n$), or alternately on a bottom surface of substrate 901 (e.g., when the substrate 901 is transmissive to the light output signal 220 from each grating 102-$m$-$n$).

Gratings 102-1-1 through 102-2-2 in the example of FIG. 9 modulate the intensity of the zeroth-order light that is transmitted to their corresponding optical detectors 988-1-1 through 988-2-2 (collectively, optical detectors 988). Optical detectors 988 are electrically connected to image processing electronics 992, which performs signal conditioning, digital signal processing, etc. In this manner, an imaging system with active wavelength filtering is developed. Other applications for the embodiment presented in FIG. 6 include, but are not limited to, a spectrographic imager and wavelength-selective camera.

Although FIG. 9 depicts an embodiment wherein two-dimensional focal plane array 991 contains only pixels having a single grating and a single optical detector, alternative embodiments include those wherein focal plane array 991 is a linear array. Alternative embodiments also include those wherein focal plane array 991 comprises pixels having:
- a plurality of gratings and a single detector;
- a single grating and a plurality of detectors; or
- a plurality of gratings and a plurality of detectors.

In some other embodiments, detectors 988 comprise:
- detectors that are all sensitive to a single wavelength;
- detectors that are each sensitive to different wavelengths;
- groups of detectors, wherein each group is sensitive to different wavelengths; or
- any combination of such detectors.

In yet additional embodiments, focal plane array 991 comprises:
- gratings that all have a single operating wavelength;
- gratings that each have different operating wavelengths;
- groups of gratings, wherein each group has a different operating wavelength; or
- any combination of such gratings.

Figure 10:
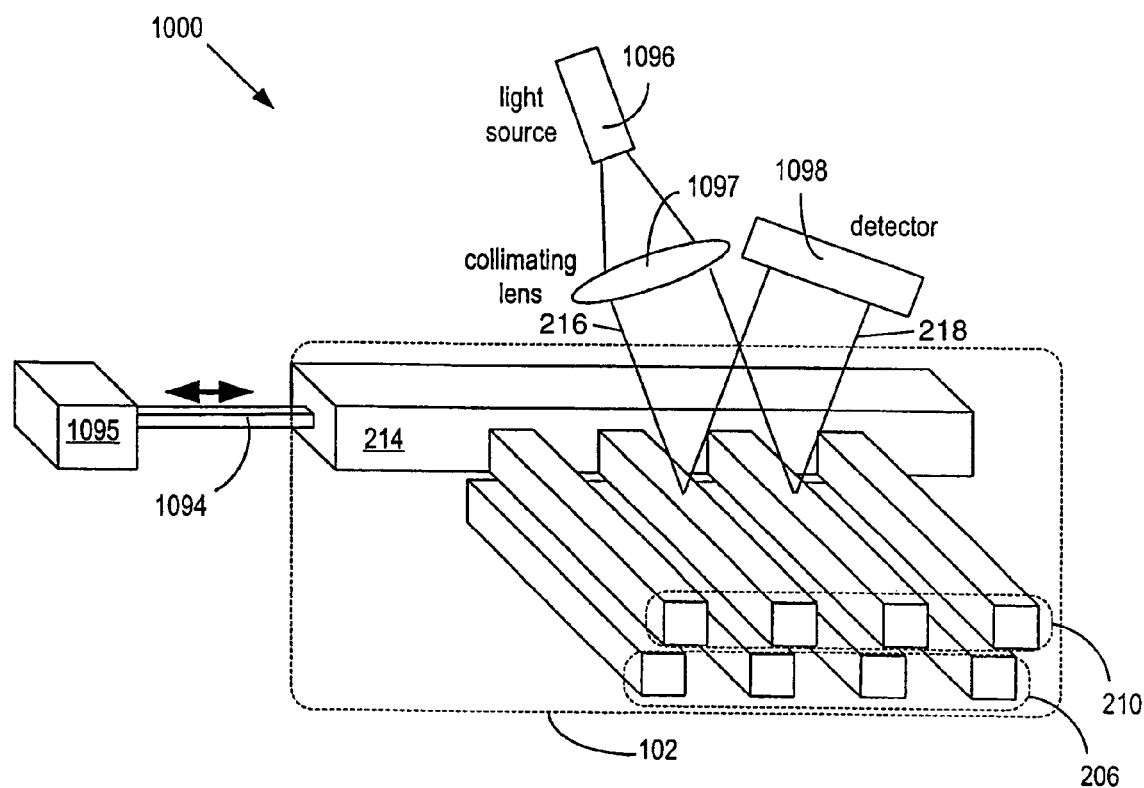
FIG. 10 depicts a perspective view of a passive grating in accordance with an illustrative embodiment of the present invention.

FIG. 10 depicts a perspective view of a passive grating in accordance with an illustrative embodiment of the present invention. Sensor-type grating 1000 comprises grating 102, which comprises sub-grating 206 and sub-grating 210. Sub-grating 210 is coupled to tether 1094 via beam 214. Tether 1094 is coupled to anchor 1095 and provides support for sub-grating 210. Furthermore, tether 1094 supports transduction of a change in an environmental factor into a force sufficient to change the position of sub-grating 210 with respect to sub-grating 206. Although FIG. 10 depicts a tether that combines the functions of support and force transducer, in some other embodiments, these functions are not combined but provided by different elements that are coupled to one of sub-gratings 206 and 210 (see FIG. 11).

Passive grating 1000 further comprises light source 1096, which provides incident light 216 at the operating wavelength of grating 102. Light 216 from light source 1096 is collimated and directed at grating 102 by optical element 1097 (e.g., a collimating lens). Detector 1098, which is sensitive to the operating wavelength, collects a portion of the light 218 (i.e., the reflected light output signal) emerging from grating 102 and provides a signal corresponding to the amount of light 218 collected. Alternative embodiments include those wherein optical element 1097 is not included, and embodiments wherein detector 1098 captures the transmissive output signal 220 of grating 102 instead of the reflective output signal 218 as shown in FIG. 10.

Figure 11:
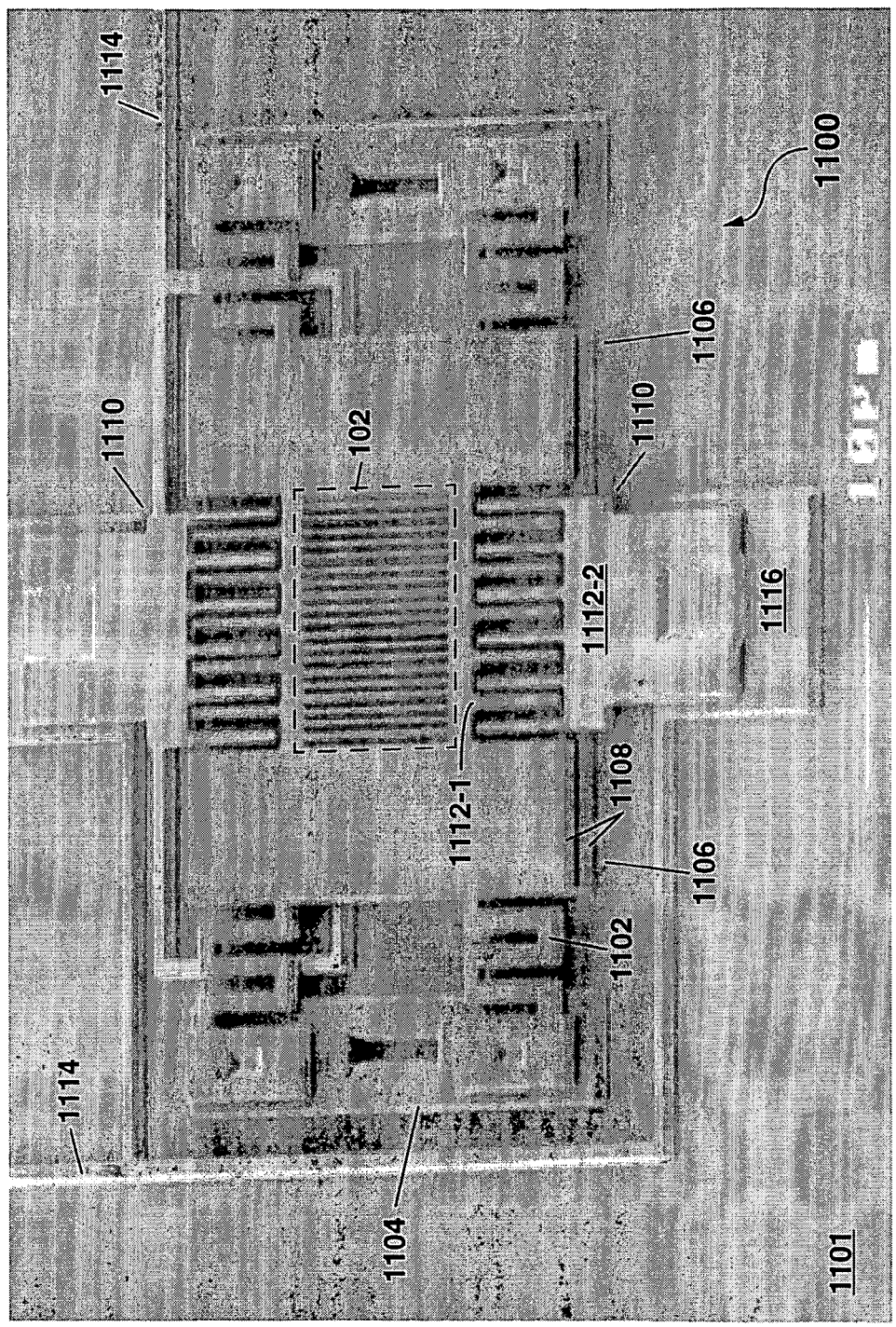
FIG. 11 shows an image of a nanomechanical near-field grating which can be used in the apparatus of the present invention.

FIG. 11 shows an image of an illustrative embodiment of a nanomechanical near-field grating apparatus 1100 according to the present invention. The grating apparatus 1100 in FIG. 11 comprises a tunable nanomechanical near-field grating 102 which further comprises a fixed sub-grating 206 which is supported on a substrate 1101, and a moveable sub-grating 210 which is superposed above the fixed sub-grating 206 (see FIGS. 2 and 10 which depict the relative locations of the moveable sub-grating 210 and the fixed sub-grating 206). The moveable sub-grating 210 in FIG. 11 is suspended above the substrate 1101 by a plurality of folded springs 1102 which have a fixed end which is connected to the substrate 1101 by an anchor 1104. A spacing of the line-elements in each sub-grating 206 and 201 is substantially the same, and is less than or equal to the operating wavelength (i.e. the wavelength of incident light with which the grating apparatus 1100 is to be used). Additionally, a vertical separation between the fixed sub-grating 206 and the moveable sub-grating 210 is less than or equal to the operating wavelength.

A vertical actuator 1106 is provided on each side of the grating 102 to vary the vertical separation (i.e., spacing) between the fixed and moveable sub-gratings 206 and 210 as needed. Additionally, a lateral actuator 1110 is provided in the grating apparatus 1100 to vary a lateral spacing between the line-elements of the fixed and moveable sub-gratings 206 and 210 as needed. Each actuator 1106 and 1110 in this example of the present invention comprises an electrostatic actuator. The vertical actuator 1106 can comprise a pair of spaced-apart capacitor plates 1108 which are responsive to an applied voltage to produce an electrostatic force of attraction that urges the capacitor plates 1108 towards each other.

The lateral actuator 1110 in FIG. 11 comprises an electrostatic comb actuator which comprises a pair of enmeshed electrostatic combs 1112, with a moveable electrostatic comb 1112-1 being operatively connected to the moveable sub-grating 210, and with a fixed electrostatic comb 1112-2 being operatively connected to the substrate 1101. In response to a voltage applied between the pair of enmeshed electrostatic combs 1112, the moveable electrostatic comb 1112-1 is urged towards the fixed electrostatic comb 1112-2 thereby changing the lateral spacing between the line-elements of the fixed and moveable sub-gratings 206 and 210.

In FIG. 11, the capacitor plate 1108 and moveable electrostatic comb 1112-1, which are suspended above the substrate 1101 together with the moveable sub-grating 210, are electrically grounded through the springs 1102 and anchor 1104 to the substrate 1101. The substrate 1101, which can comprise silicon, is electrically conducting in the example of FIG. 11. Electrical wiring 1114 is provided on the substrate 1101 to provide electrical connections to the remaining capacitor plate 1108 and the fixed electrostatic comb 1112-2. The electrical wiring 1114 is electrically insulated from the substrate 1101 by an intervening electrically-insulating layer (e.g. comprising silicon nitride). Separate electrical wiring 1114 and bond pads (see FIG. 14) are provided to independently operate the vertical actuators 1106 and the lateral actuators 1110 using external voltage sources, with each pair of actuators 1106 or 1110 being electrically connected in parallel.

A plurality of devices 1100 as shown in FIG. 11 can be batch fabricated on a 150-mm-diameter silicon wafer and then separated (i.e., diced) and individually packaged. Alternately, a plurality of devices 1100 can be provided on a common substrate 1101 as an array (see FIG. 9) or as a multi-axis acceleration sensor (see FIG. 14).

The nanomechanical near-field grating apparatus 1100 in FIG. 11 can be fabricated by surface micromachining as will be described in detail hereinafter. An n-type doped silicon substrate 1101 can be initially prepared by blanket depositing a layer of silicon dioxide about 0.6 μm thick on all exposed surfaces of the substrate 1101. This can be done using a conventional wet oxidation process at an elevated temperature (e.g., 1050° C. for about 1.5 hours). The silicon substrate 1101 can then be coated with a low-stress layer of silicon nitride about 0.8 μm thick in a low-pressure chemical vapor deposition (LPCVD) apparatus at about 850° C. An opening can be etched (e.g. using reactive ion etching) through the electrically-insulating layers of silicon dioxide and silicon nitride at the location where each anchor 1104 will be formed to electrically ground a moveable side of each actuator 1106 and 1110 through the springs 1102 and the anchors 1104. An additional opening can be formed through the low-stress layer of silicon nitride and the underlying layer of silicon dioxide to the substrate 1101 at a location beneath the electrostatic combs 1112-1 and 1112-2 on either side of the fixed sub-grating 206 to electrically ground the fixed sub-grating 206.

The various elements of the grating apparatus 1100 can then be built up from a plurality of layers of polycrystalline silicon (also termed polysilicon). A first polysilicon layer (termed Poly-0) 0.865 µm thick can be blanket deposited over the substrate 1101 by LPCVD at about 580° C. This can be done using two LPCVD depositions. In the first LPCVD deposition, about 0.7 µm of undoped polysilicon can be blanket deposited over the substrate 1101. The thickness of this undoped polysilicon layer can be measured, and a second slow LPCVD deposition can be used to deposit the remaining thickness of the Poly-0 layer using n-type doped polysilicon (e.g., n-type doped with phosphorous). A later annealing step will distribute the n-type dopant from the n-type doped polysilicon throughout the Poly-0 layer. The Poly-0 layer can then be patterned using an etch mask which is photolithographically defined using a 248 nm lithography tool and reactive ion etching using fluorinated plasma etch gas mixtures. The 248 nm lithography tool allows the formation of line-elements having a width of 0.2-0.25 µm. Patterning of the Poly-0 layer forms the fixed sub-grating 206, the capacitor plates 1108 which are fixed to the substrate 1101, the anchors 1104, the wiring 1114 and a base 1116 whereon each fixed electrostatic comb 1112-2 will later be formed.

The terms "patterning" and "patterned" as used herein refer to a series of well-known semiconductor processing steps including applying a photoresist to the substrate 1101, prebaking the photoresist, aligning the substrate 1101 with a photomask, exposing the photoresist through the photomask, developing the photoresist, baking the substrate 1101, etching away the surfaces not protected by the photoresist, and stripping the protected areas of the photoresist so that further processing can take place. The terms "patterning" and "patterned" can further include the formation of a hard mask (e.g. comprising about 500 nanometers of a silicate glass deposited from the decomposition of tetraethylortho silicate, also termed TEOS, by LPCVD or plasma-enhanced chemical vapor deposition at about 750° C. and densified by a high temperature processing) overlying a polysilicon or sacrificial material layer in preparation for defining features into the layer by etching (e.g., reactive ion etching).

After patterning of the Poly-0 layer, a sacrificial material (e.g., silicon dioxide or TEOS) can be blanket deposited over the substrate 1101. The sacrificial material also fills in the spaces between the line-elements of the fixed sub-grating 206. After deposition, the sacrificial material can be planarized using chemical-mechanical polishing (CMP). This also allows the thickness of the sacrificial material to be precisely adjusted to provide a vertical spacing between the fixed sub-grating 206 and a subsequently-deposited polysilicon layer (termed Poly-1) which will be used to form the moveable sub-grating 210. This vertical spacing is less than or equal to the operating wavelength (i.e., $\leq 1$ µm). After the CMP step, the sacrificial material can be patterned to form openings down to the Poly-0 layer at locations wherein the Poly-1 layer is to be connected to the Poly-0 layer. This includes the ends of each spring 1102 which will be connected to the anchors 1104, and also the fixed electrostatic combs 1112-2 which will be supported on the bases 1116.

The Poly-1 layer can have the same layer thickness (i.e., 0.865 µm) as the Poly-0 layer, and can be blanket deposited in the same way using two LPCVD steps. The Poly-1 layer can then be patterned using the 248 nm lithography tool to form the moveable sub-grating 210, the springs 1102, and the moveable capacitor plates 1108 and moveable electrostatic combs 1112-1.

A final layer of the sacrificial material about 0.5 µm thick can then be blanket deposited over the substrate 1101 to encapsulate the various elements of the tunable nanomechanical near-field grating 1100 in preparation for an annealing step which is use to diffuse the n-type dopant throughout the Poly-0 and Poly-1 layers, and also to anneal out any stress within these layers. This annealing step can be performed at an elevated temperature of about 1100° C. for up to several hours.

After the annealing step, the substrate 1101 can be scribed to separate out die containing one or more devices 1100. The sacrificial material can then be removed by immersing each die into a selective wet etchant comprising hydrofluoric acid (HF). The HF etchant dissolves away the sacrificial material without substantially chemically attacking the substrate and the polysilicon and silicon nitride layers. Each die can then be rinsed with de-ionized water, immersed in methanol and dried using critical point drying in carbon dioxide ($CO_2$). The die can then be packaged using a deep-well 24 pin dual in-line (DIP) package and wire bonded to provide convenient electrical access for actuation of the vertical and lateral actuators 1106 and 1110.

The nanomechanical near-field grating apparatus 1100 in the example of FIG. 11 has a measured resonant frequency for in-plane motion (i.e., lateral motion in the plane of the substrate 1101) which is 2.84 megaHertz (MHz). The fixed and moveable sub-gratings 206 and 210, respectively, have line-elements which are spaced with a period (i.e, a fixed repeat period) of 720 nanometers.

The nanomechanical near-field grating apparatus 1100 of FIG. 11 can be used as an active grating as previously described with reference to FIG. 6, or alternately as a passive grating as previously described with reference to FIG. 10. The nanomechanical near-field grating apparatus 1100 of FIG. 11 can also be used to form an acceleration sensor as will be described in detail hereinafter.

As previously described in FIGS. 2 and 10, a light source can be used to provide light incident on the nanomechanical near-field grating 102 at the operating wavelength, with a portion of the incident light being reflected off or transmitted through the moveable and fixed sub-gratings 210 and 206 and then detected. The light source can comprise a conventional vertical-cavity surface-emitting laser (VCSEL), or a light-emitting diode (LED).

VCSELs are well-known in the art and can be operated in a single longitudinal mode (i.e., single-frequency) and also in a single transverse mode to provide a light beam which is well-suited for use with the nanomechanical near-field grating 102 of the present invention. Furthermore, a VCSEL emits light in a direction which is substantially perpendicular to a substrate whereon the VCSEL is formed. Examples of VCSELs which can be used for practice of the present invention are disclosed in U.S. Pat. Nos. 5,351,256; 5,428,634; 5,493,577; 5,557,627; 5,568,499; 5,633,527; and 5,903,590 which are incorporated herein by reference.

Figure 12:
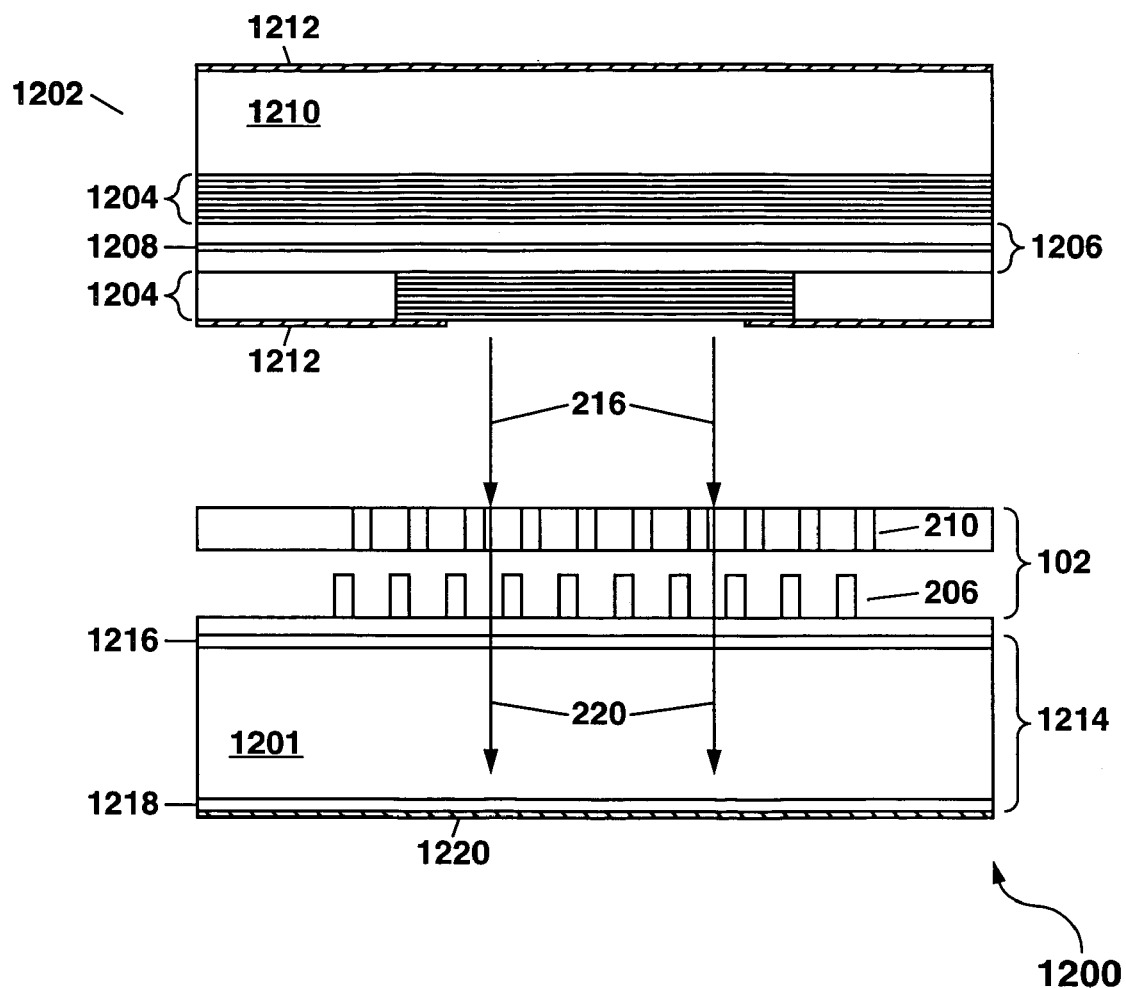
FIG. 12 depicts an illustrative embodiment of the nanomechanical near-field grating apparatus of the present invention which includes a vertical-cavity surface-emitting laser (VCSEL) light source and a p-i-n photodetector formed in a silicon substrate below the near-field grating to detect a portion of the incident light transmitted therethrough.

FIG. 12 depicts a schematic cross-section view of an illustrative embodiment of the nanomechanical near-field grating apparatus 1200 which incorporates a light source in the form of a VCSEL 1202 which can be mounted above the grating 102 to provide incident light 216 onto the moveable and fixed sub-gratings 210 and 206 in a direction which is substantially normal to a plane of the sub-gratings 210 and

206. The VCSEL 1202 comprises a pair of distributed Bragg reflector (DBR) mirrors 1204 sandwiched about an active region 1206, with one of the DBR mirrors 1204 being p-type doped, and with the other DBR mirror 1204 being n-type doped. The active region 1206 generally comprises one or more quantum-well layers 1208. The VCSEL 1202, which can be epitaxially grown on a semiconductor substrate 1210, is electrically activated to produce lasing light 216. To electrically activate the VCSEL 1202, a voltage can be applied between electrodes 1212 located on both sides of the active region 1206.

The VCSEL 1202 can be formed from III-V or II-VI compound semiconductor materials which can be selected depending upon the operating wavelength. For an operating wavelength in the 0.3-0.6 µm range, II-VI compound semiconductor materials can be used for the VCSEL 1202; whereas, for an operating wavelength in the 0.6-1 µm range, III-V compound semiconductor materials can be used.

In the illustrative embodiment of the present invention in FIG. 12, a detector 1214 (also referred to herein as a position-sensing detector) is located beneath the sub-gratings 210 and 206 to detect a portion 220 of the incident light 216 which is transmitted through the sub-gratings 210 and 206. The portion 220 of the light 216 detected by the detector 1214 generates a detector output signal whose magnitude is proportional to the lateral or vertical position of the moveable sub-grating 210.

The detector 1214 can be formed on or within a silicon substrate 1201 whereon the grating 102 is to be fabricated. As an example, the detector 1214 can comprise a silicon p-i-n photodetector 1214. The silicon p-i-n photodetector 1214 can be formed in an intrinsic (i) silicon substrate 1201. An n-side 1216 of the p-i-n photodetector 1214 can be formed by locally doping a top side of the intrinsic silicon substrate 1201 with phosphorous using ion implantation or thermal diffusion. A p-side 1218 of the p-i-n photodetector 1214 can be formed by locally doping a bottom side of the intrinsic silicon substrate 1201 with boron using ion implantation or thermal diffusion. The nanomechanical near-field grating 102 can then be fabricated on the substrate 1201 as previously described with reference to FIG. 11. During the annealing step used to uniformly dope the Poly-0 and Poly-1 layers, the phosphorous and boron can be thermally diffused inward by a distance of up to a few microns thereby completing the n-side 1216 and p-side 1218 of the p-i-n photodetector. An electrical contact to the n-side 1216 can be made using the Poly-0 layer. A second electrical contact can be made to the p-side 1218 using a deposited or sputtered metallization 1220 which can comprise a metal such as aluminum, or tungsten, or an alloy thereof.

Those skilled in the art will understand that there are other types of detectors which can be formed in the silicon substrate 1201 including silicon p-n detectors and phototransistors. Additionally, in some embodiments of the present invention, a reference detector can be formed on or within the silicon substrate 1201 to detect a reference portion of the light 216 which bypasses the grating 102. Such a reference detector is useful in a balanced detection arrangement to cancel out noise due to sources other than a movement of the moveable sub-grating 210 (e.g., due to amplitude fluctuations of the light 216).

The reference detector can be formed in the same way that the position-sensing detector 1214 is formed, with the reference detector being electrically isolated from the position-sensing detector 1214 on at least one side of the substrate 1201. In the example of FIG. 12, the electrical isolation between the position-sensing detector 1214 and an additional reference detector can be provided by etching down through the n-side 1216 or p-side 1218 or both between the two detectors. As an example, an annular trench can be etched down through the n-side 1216 and into the intrinsic substrate 1201. The annular trench can then be filled with the electrically-insulating layers of silicon dioxide and silicon nitride.

In the example of FIG. 12, the VCSEL 1202 can be attached to the substrate 1201 to form a compact, rugged structure for the nanomechanical near-field grating apparatus 1200. This can be done, for example, using a plurality of standoffs (not shown) which can be formed on one or both of the substrates 1201 and 1210. The standoffs can be built up on the silicon substrate 1201 from a plurality of deposited layers of polysilicon (including the Poly-0 and Poly-1 layers), silicon nitride and metal. Additionally, portions of the sacrificial material can be encapsulated and thereby retained to build up the standoffs. The VCSEL 1202 can be attached to the standoffs on the silicon substrate 1201 using solder (e.g., solder bump bonding).

As an alternative to a plurality of standoffs for attaching the substrates 1201 and 1210 together, an annular spacer can be used (e.g., comprising a semiconductor, glass or ceramic). A patterned metallization can be provided on both sides of the annular spacer so that the substrates 1201 and 1210 can be attached to the annular spacer using solder.

Although not shown in FIG. 12, the VCSEL 1202 can optionally comprise a lens which can be formed on or attached to a side of the VCSEL 1202 nearest the grating 102 to collimate or focus the light 216. Alternately, the lens can be formed integrally within the VCSEL 1202 as disclosed in U.S. Pat. No. 5,633,527 which is incorporated herein by reference.

In other embodiments of the present invention, a light-emitting diode (LED) can be substituted for the VCSEL 1202 in FIG. 12. The LED can comprise an epitaxially-grown semiconductor p-n or p-i-n junction formed from III-V or II-VI compound semiconductor materials, with the exact materials being used depending upon the operating wavelength. An LED can also be formed using the VCSEL structure shown in FIG. 12 by forward-biasing the VCSEL 1202 below a threshold for lasing, or alternately by providing a DBR mirror 1204 through which the light 216 is emitted which has a lower reflectivity than that required for lasing. Generally 20-30 or more mirror periods are required to provide a mirror reflectivity of 98-99% which is required for lasing action in a VCSEL. By providing fewer mirror periods, the reflectivity of this DBR mirror 1204 can be reduced to about 90% which will prevent lasing and form a resonant cavity light-emitting diode (RCLED).

In yet other embodiments of the present invention, a light source and detector can be located on a common substrate on a side of the moveable sub-grating 210 which is opposite the fixed sub-grating 206. As an example, a VCSEL light source can be integrated with a resonant-cavity photodetector on a common substrate as disclosed in U.S. Pat. No. 5,987,401 which is incorporated herein by reference. As another example, a VCSEL light source can be integrated with a p-i-n photodetector on a common substrate as disclosed in an article by Evan Thrush et. al, "Integrated Semiconductor Vertical-Cavity Surface-Emitting Lasers and PIN Photodetectors for Biomedical Fluorescence Sensing," IEEE Journal of Quantum Electronics, vol. 40, pp. 491-498, May 2004.

The light 216 can be directed onto the grating 102 at an angle so that the reflected light portion 216 will be directed back into the detector. This can be done using a light-directing element such as a lens, a diffractive optical element, or a prism. The light-directing element can be formed directly on a light-emitting surface of the light source, or on a substrate which is attached to the light-emitting surface. In some cases, light from the light source can be emitted through the substrate whereon the light source is epitaxially grown, with the light-directing element being formed on or within this substrate (e.g., as a diffractive optical element).

Figure 13:
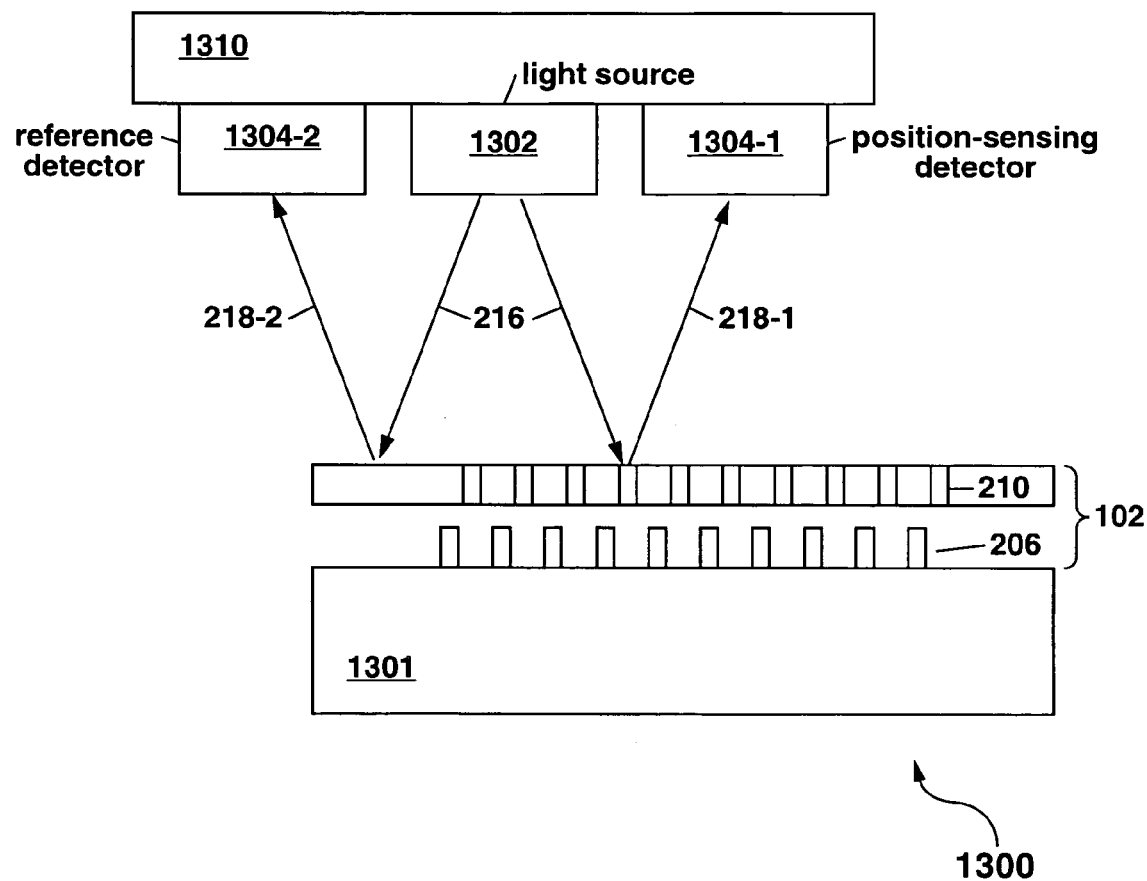
FIG. 13 depicts an illustrative embodiment of the nanomechanical near-field grating apparatus of the present invention which includes a light source and a pair of light detectors located on a common substrate proximate to the near-field grating, with one of the detectors being used to detect a portion of the incident light reflected from the near-field grating, and with the other detector being a reference detector which is used to detect a reflected portion of the incident light which bypasses the near-field grating.

In the illustrative embodiment of FIG. 13, a light source 1302 is provided on a common substrate 1310 together with a pair of detectors 1304, including a first detector 1304-1 (i.e., a position sensing detector) which detects a portion 218-1 of the light 216 that is reflected off the grating 102, and a second detector 1304-2 (i.e., a reference detector) which detects a reference portion 218-2 of the light 216 that is reflected off a reference surface outside the grating 102 (i.e., the reference light portion 218-2 bypasses the moveable and fixed sub-gratings 210 and 206). The reference surface can comprise a top surface of one of the moveable capacitor plates 1108 or a top surface of one of the fixed electrostatic combs 1112-2 (see FIG. 11), or an upper surface of a substrate 1301 whereon the grating 102 is supported (see FIG. 13). The reference detector 1304-2 provides an electrical output signal which can be combined with the electrical output signal of the detector 1304-1 to substantially remove any common-mode noise (i.e., noise due to the light source or other factors which is common to both reflected light portions 218-1 and 218-2) and thereby improve a sensitivity for sensing a movement of the moveable sub-grating 210 relative to the fixed sub-grating 206. In other embodiments of the present invention wherein a transmitted light portion 220 is detected, a reference detector can be similarly used to detect a portion of the light 216 which bypasses the moveable and fixed sub-gratings 210 and 206.

One particular application of the nanomechanical near-field grating apparatus of the present invention is as an accelerometer (i.e., an acceleration sensor) for sensing an environmentally-induced force due to acceleration, shock, vibration, gravity, etc. Since the moveable sub-grating 210 can be suspended by a plurality of springs as shown in FIGS. 6 and 11, a lateral or vertical movement of the sub-grating 210 can be directly related to an acceleration component in a direction of movement of the sub-grating 210 (i.e., $F=-kx=mA$ so that $A=-kx/m$ where k is a spring constant, x is a displacement of the moveable sub-grating 210 in response to a sensed acceleration A, and m is a mass associated with the sub-grating 210). Furthermore, a portion of the incident light 216 reflected from or transmitted through the moveable and fixed sub-gratings 210 and 206 can be used to determine the displacement of the moveable sub-grating 210 and thereby determine the sensed acceleration optically.

In a nanomechanical near-field grating apparatus formed according to the illustrative embodiments provided herein, a particular axis for sensing acceleration (i.e., lateral or vertical) can be selected by appropriately shaping the springs supporting the moveable sub-grating 210, with the sensitivity for detecting an acceleration along this axis being determined by the spring constant, k, of the plurality of springs supporting the moveable sub-grating 210 and the mass, m, associated with the moveable sub-grating 210. In the example of FIG. 11, the mass associated with the moveable sub-grating 210 includes the mass of the moveable capacitor plates 1108 and moveable electrostatic combs 1112-1. In other embodiments of the present invention, additional mass (i.e. a proof mass) can be provided operatively connected to the moveable sub-grating 210 to increase a sensitivity for detecting an acceleration with the nanomechanical near-field grating apparatus.

To form an accelerometer for sensing an in-plane acceleration (i.e., an acceleration in a lateral direction substantially parallel to a plane of the moveable sub-grating 210), the springs 1102 in FIG. 11 can be made with a width which is smaller than the thickness of the springs (e.g., by a factor of about three or more). Similarly, to form an accelerometer for sensing an out-of-plane acceleration (i.e., an acceleration in a vertical direction substantially perpendicular to the plane of the moveable sub-grating 210), the springs 1102 in FIG. 11 can be made with a width that exceeds the thickness (e.g., by a factor of about three or more). Alternately, instead of the folded springs shown in FIG. 11, a plurality of leaf springs can be used (see FIG. 14).

Figure 14:
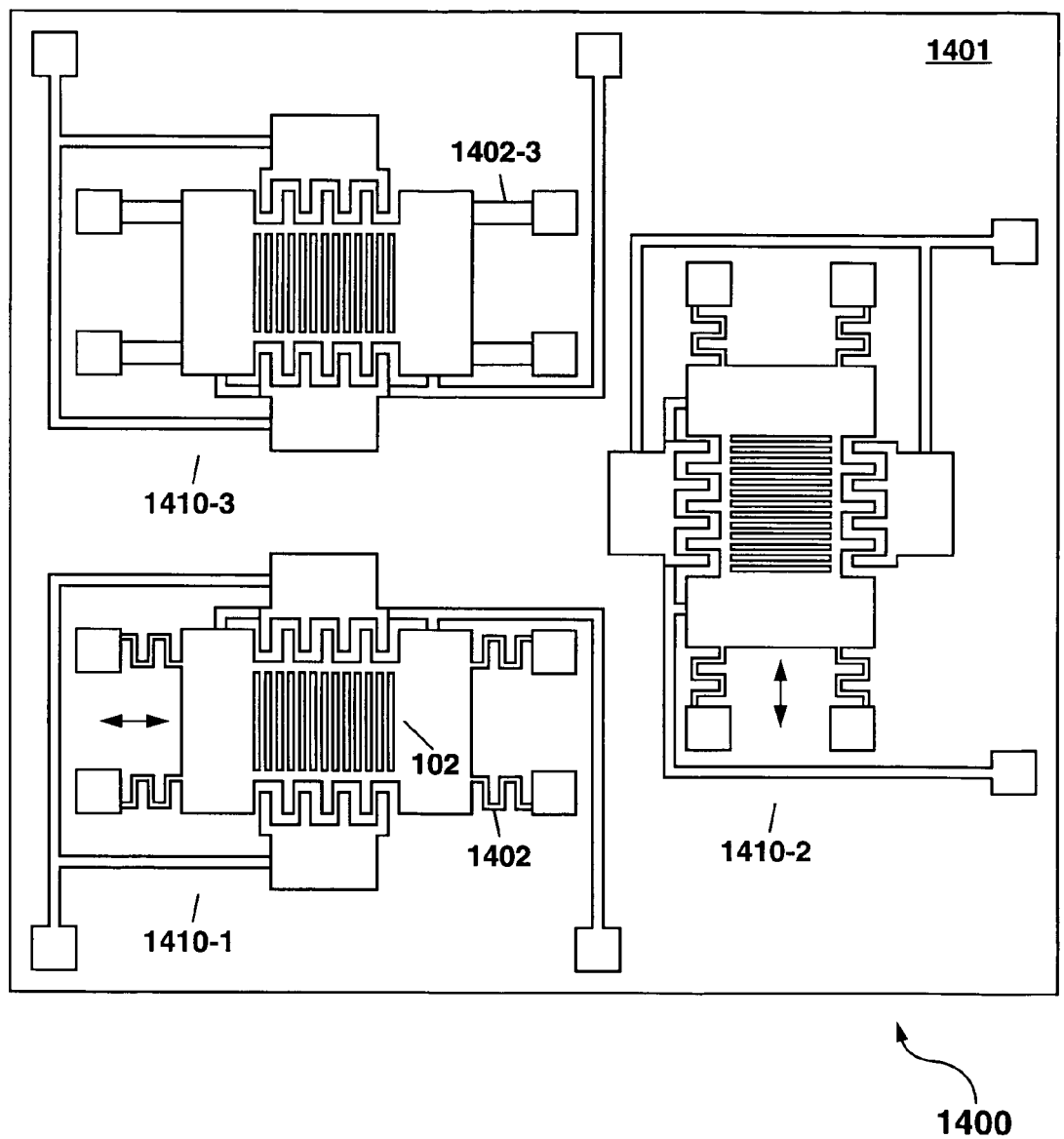
FIG. 14 depicts an illustrative embodiment of the present invention wherein a plurality of nanomechanical near-field grating devices are located on a common substrate, with each device being adapted to sense an acceleration along an x, y or z axis, thereby forming a multi-axis acceleration sensor.

In another illustrative embodiment of the present invention, a plurality of accelerometers are provided on a common substrate to form a multi-axis accelerometer 1400 capable of sensing acceleration along multiple axes. This is depicted in FIG. 14 which shows a plurality of nanomechanical near-field grating devices 1410 provided on a common substrate 1401, with each device 1410 being adapted to sense an acceleration along a different axis. The devices 1410-1 and 1410-2 are adapted to sense an acceleration directed in the plane of the substrate 1401 in two orthogonal directions (i.e., along x and y axes) indicated by the double-sided arrows. The remaining device 1410-3 is adapted to sense an acceleration along a vertical axis (i.e., along the z axis) which is directed substantially perpendicular to the substrate 1401 (i.e., out of the plane of the paper) using a plurality of leaf springs 1410-3.

In the example of FIG. 14, each nanomechanical near-field grating device 1410 can be optically readout using an incident light beam 216 from a light source as previously described. A plurality of light sources (e.g., VCSELs or LEDs) can be provided on another substrate located above the substrate 1401 in FIG. 14, with each light source being located above one of the accelerometers 1410. A portion 220 of the incident light 216 transmitted through each accelerometer 1410 can be detected using a detector located on or within the substrate 1401 (e.g., a silicon substrate) beneath the nanomechanical near-field grating 102 of each accelerometer 1410. Integrated electronic circuitry comprising a plurality of interconnected transistors can be optionally formed on the substrate 1401 to process the electrical output signal from each detector. The integrated electronic circuitry can also be used in a feedback control loop to actively control the position of the moveable sub-grating 210 in each accelerometer using the lateral and vertical actuators previously described with reference to FIG. 11.

In other embodiments of the present invention wherein a portion 218 of the incident light 216 reflected off each grating 102 is to be detected, one or more detectors can be provided above each grating 102 as depicted in FIGS. 10 and 13. The light sources and detectors can be optionally located on the same substrate. A common substrate containing the light sources and detectors can further be directly attached to the substrate 1401 containing the accelerometers 1410 to form a compact assembly. As previously described, this can be done using a plurality of standoffs and solder, or alternately using an annular spacer and solder.

The various illustrative embodiments of the nanomechanical near-field grating apparatus of the present invention described herein and accelerometers formed therefrom can be packaged in a hermetically-sealed enclosure at an ambient pressure or under vacuum. Packaging under vacuum can be advantageous to reduce a viscous damping of the moveable sub-grating 210.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout this Specification to "one embodiment" or "an embodiment" or "some embodiments" means that a particular feature, structure, material, or characteristic described in connection with the embodiment(s) is included in at least one embodiment of the present invention, but not necessarily in all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A nanomechanical near-field grating apparatus, comprising:
   (a) a fixed sub-grating supported on a substrate and having a plurality of line-elements, with each adjacent pair of the line-elements being spaced apart by a first distance which is less than or equal to an operating wavelength;
   (b) a moveable sub-grating suspended above the substrate by a plurality of springs and being located substantially parallel to the fixed sub-grating and vertically separated therefrom by a second distance which is substantially equal to or less than the operating wavelength, with the moveable sub-grating having another plurality of line-elements spaced apart by the first distance;
   (c) a light source providing light at the operating wavelength incident onto the moveable and stationary sub-gratings; and
   (d) a detector located proximate to the moveable and fixed sub-gratings to detect a portion of the light after reflection from or transmission through the moveable and fixed sub-gratings.

2. The apparatus of claim 1 wherein each spring comprises a folded spring.

3. The apparatus of claim 1 further comprising a vertical actuator operatively connected to the moveable sub-grating to vary the second distance.

4. The apparatus of claim 1 further comprising a lateral actuator operatively connected to the moveable sub-grating to change a lateral spacing between the line-elements of the moveable and fixed sub-gratings.

5. The apparatus of claim 1 wherein the light source and the detector are located on a common substrate.

6. The apparatus of claim 5 further comprising a reference detector located on the common substrate, with the reference detector being positioned to detect a reference portion of the light which bypasses the moveable and fixed sub-gratings.

7. The apparatus of claim 1 wherein the light source and the detector are located on opposite sides of the moveable sub-grating.

8. The apparatus of claim 7 wherein the detector is located on a substrate which holds the fixed sub-grating, with the moveable sub-grating being suspended above the substrate by a plurality of springs.

9. The apparatus of claim 8 further comprising a reference detector on the substrate to detect a reference portion of the light which bypasses the moveable and stationary sub-gratings.

10. The apparatus of claim 1 wherein the light source comprises a vertical-cavity surface-emitting laser (VCSEL).

11. The apparatus of claim 1 wherein the light source comprises a light-emitting diode (LED).

12. The apparatus of claim 1 further comprising a lens located between the light source and the moveable and fixed sub-gratings.

13. A nanomechanical near-field grating apparatus, comprising:
   (a) a fixed sub-grating having a plurality of line-elements, with each adjacent, pair of the line-elements being spaced apart by a first distance which is less than or equal to an operating wavelength;
   a moveable sub-grating located substantially parallel to the fixed sub-grating and vertically separated therefrom by a second distance which is substantially equal to or less than the operating wavelength, with the moveable sub-grating having another plurality of line-elements spaced apart by the first distance;
   (c) a light source providing light at the operating wavelength incident onto the moveable and stationary sub-gratings; and
   (d) a detector located proximate to the moveable and fixed sub-gratings to detect a portion of the light after reflection from or transmission through the moveable and fixed sub-gratings wherein the detected portion of the light provides an indication of a movement of the moveable sub-grating in response to a sensed acceleration.

14. An acceleration sensor, comprising:
   (a) a first sub-grating which is moveable in response to a sensed acceleration, with the first sub-grating further comprising a plurality of line-elements spaced apart by a distance less than or equal to an operating wavelength;
   (b) a second sub-grating located proximate to the first sub-rating, with the second sub-grating remaining fixed in position in response to the sensed acceleration, and with the second sub-grating further comprising another plurality of line-elements spaced apart by substantially the same distance as the line-elements of the first sub-grating;
   (c) a light source providing light incident onto the first and second sub-gratings at the operating wavelength, and
   (d) a detector for detecting any change in a reflected or transmitted portion of the light in response to a movement of the first sub-grating relative to the second sub-grating due to the sensed acceleration.

15. The apparatus of claim 14 further comprising a lens for directing the light from the light source onto the first and second sub-gratings.

16. The apparatus of claim 14 wherein the first and second sub-gratings are superposed one above the other.

17. The apparatus of claim 14 wherein line-elements of the first and second sub-gratings are separated by a spacing which is less than or equal to the operating wavelength.

18. The apparatus of claim 14 further comprising a vertical actuator operatively connected to vary a vertical spacing between the first and second sub-gratings.

19. The apparatus of claim 14 further comprising a lateral actuator which is operatively connected to laterally move the line-elements of the first sub-grating with respect to the line-elements of the second sub-grating.

20. The apparatus of claim 14 wherein the light source and the detector are located on a common substrate.

21. The apparatus of claim 20 further comprising a reference detector located on the common substrate, with the reference detector being positioned to detect a reference portion of the light which bypasses the first and second subs-gratings.

22. The apparatus of claim 14 wherein the first sub-grating is suspended above a substrate by a plurality of springs, and the second sub-grating is supported on the substrate.

23. The apparatus of claim 22 wherein at least one of the light source and the detector are located on the substrate beneath the first and second sub-gratings.

24. The apparatus of claim 23 further comprising a reference detector to detect a reference portion of the light which bypasses the first and second sub-gratings.

25. The apparatus of claim 22 wherein at least one of the light source and the detector are located on another substrate above the first and second sub-gratings.

26. The apparatus of claim 25 further comprising a reference detector to detect a reference portion of the light which bypasses the first and second sub-gratings.

27. The apparatus of claim 14 wherein the light source comprises a vertical-cavity surface-emitting laser (VCSEL).

28. The apparatus of claim 14 wherein the light source comprises a light-emitting diode (LED).

29. A multi-axis acceleration sensor, comprising:
(a) a plurality of nanomechanical near-field devices formed on a substrate, with each nanomechanical near-field device further comprising:
 (i) a first sub-grating which is moveable along an axis in response to a sensed acceleration, with the first sub-grating further comprising a plurality of line-elements spaced apart by a distance less than or equal to an operating wavelength; and
 (ii) a second sub-grating located proximate to the first sub-grating, with the second sub-grating remaining fixed in position in response to the sensed acceleration, and with the second sub-grating further comprising another plurality of line-elements spaced apart by substantially the same distance as the line-elements of the first sub-grating;
(b) a light source providing light at the operating wavelength incident onto the first and second sub-gratings of each nanomechanical near-field device; and
(c) a detector located proximate to each nanomechanical near-field device to detect a change in a reflected or transmitted portion of the light incident thereon in response to the sensed acceleration.

30. The multi-axis acceleration sensor of claim 29 wherein the first and second sub-gratings of each nanomechanical near-field device are separated from one another by a spacing which is less than or equal to the operating wavelength.

31. The multi-axis acceleration sensor of claim 29 further comprising a reference detector located proximate to each nanomechanical near-field device to detect a reference portion of the light which bypasses the first and second sub-gratings therein.

32. The multi-axis acceleration sensor of claim 29 wherein the light source comprises a vertical-cavity surface-emitting laser (VCSEL) or a light-emitting diode (LED).

33. A method for sensing an acceleration, comprising:
providing a pair of sub-gratings superposed one above the other with a spacing therebetween which is less than or equal to an operating wavelength, with each sub-grating further comprising a plurality of line-elements spaced apart by a distance less than or equal to the operating wavelength with one of the sub-gratings being fixed, and with the other sub-grating being suspended on springs for movement in response to the acceleration;
directing light from a light source onto the pair of sub-gratings; and
detecting with a detector a portion of the light from the light source which is reflected from or transmitted through the pair of sub-gratings, and determining therefrom the acceleration.

34. The method of claim 33 wherein the acceleration is directed substantially perpendicular to a plane defied by the moveable sub-grating.

35. The method of claim 33 wherein the acceleration is directed substantially parallel to a plane defined by the moveable sub-grating.

36. The method of claim 33 further comprising a step of changing a lateral spacing of the line-elements of the moveable sub-grating relative to the line-elements of the fixed sub-grating.

37. The method of claim 33 further comprising a step of changing a vertical spacing between the line-elements of the moveable sub-grating and the line-elements of the fixed sub-grating.

* * * * *